(12) United States Patent
Baizel et al.

(10) Patent No.: US 11,745,206 B2
(45) Date of Patent: Sep. 5, 2023

(54) FILTERING APPARATUS WITH AT LEAST ONE FILTER UNIT

(71) Applicant: Columbus Industries, Inc., Ashville, OH (US)

(72) Inventors: Daniel J. Baizel, Wilmington, OH (US); James E. Large, Circleville, OH (US); Mounir B. H. Slama, Dublin, OH (US)

(73) Assignee: Columbus Industries, Inc., Ashville, OH (US)

( * ) Notice: Subject to any disclaimer, the term of this patent is extended or adjusted under 35 U.S.C. 154(b) by 414 days.

(21) Appl. No.: 17/001,108

(22) Filed: Aug. 24, 2020

(65) Prior Publication Data

US 2022/0055058 A1 Feb. 24, 2022

(51) Int. Cl.
| | |
|---|---|
| *B01D 46/10* | (2006.01) |
| *B01D 46/00* | (2022.01) |
| *B01D 46/48* | (2006.01) |
| *B01D 46/58* | (2022.01) |

(Continued)

(52) U.S. Cl.
CPC .............. *B05B 14/43* (2018.02); *B01D 46/48* (2013.01); *B65D 19/06* (2013.01); *B01D 2258/0258* (2013.01); *B65D 2519/00159* (2013.01); *B65D 2519/00333* (2013.01); *B65D 2519/00497* (2013.01); *B65D 2519/00621* (2013.01); *B65D 2519/00666* (2013.01)

(58) Field of Classification Search
CPC ........ B01D 46/10; B01D 46/48; B01D 46/58; B01D 46/0005; B01D 46/0013; B01D 2258/0258; B05B 14/43; B05B 15/12; B65D 2519/00333; B65D 2519/00497; B65D 2519/00621
USPC ............ 55/385.1, DIG. 46; 118/326, DIG. 7; 454/51, 52

See application file for complete search history.

(56) References Cited

U.S. PATENT DOCUMENTS

| | | | | |
|---|---|---|---|---|
| 5,153,034 A | * | 10/1992 | Telchuk | B05B 16/60 427/427.2 |
| 5,264,014 A | * | 11/1993 | Lannefors | B05B 14/468 96/77 |

(Continued)

FOREIGN PATENT DOCUMENTS

| | | |
|---|---|---|
| DE | 102011108631 A1 | 1/2013 |
| DE | 102011117667 A1 | 5/2013 |

(Continued)

*Primary Examiner* — Minh Chau T Pham
(74) *Attorney, Agent, or Firm* — Jason H. Foster; Kremblas & Foster

(57) ABSTRACT

A filtering apparatus having a housing with lateral, upstream and downstream walls, and a top plate disposed at a significant angle to incoming overspray air to accelerate and guide the particulate-laden air. The angle of the top plate directs the air upstream and away from the filters so the larger solids impact the top plate and wall and adhere, removing paint from the air. Larger solids too massive to turn while accelerating through an opening into an entry chamber collect on the upstream sidewall and the highly filtered air flows toward filter units disposed downstream of the entry opening. Lighter solids that flow downstream are removed by the filtration media. An overhang of the angled top plate reduces flow into the filter units of collected solids.

13 Claims, 22 Drawing Sheets

(51) Int. Cl.
*B05B 14/43* (2018.01)
*B65D 19/06* (2006.01)

(56) References Cited

U.S. PATENT DOCUMENTS

| | | | | |
|---|---|---|---|---|
| 6,139,421 | A * | 10/2000 | Tong | B05B 14/468 |
| | | | | 454/52 |
| 6,830,602 | B2 * | 12/2004 | Norman | B01D 45/08 |
| | | | | 126/299 F |
| 6,896,733 | B2 * | 5/2005 | Schiele | B05B 14/43 |
| | | | | 118/326 |
| 6,969,428 | B2 * | 11/2005 | Guiduzzi | B05B 14/44 |
| | | | | 118/326 |
| 8,241,406 | B2 * | 8/2012 | Weschke | B05B 14/437 |
| | | | | 95/286 |
| 9,427,692 | B2 * | 8/2016 | Tashiro | B01D 47/022 |
| 9,566,611 | B2 | 2/2017 | Lang-Koetz et al. | |
| 2008/0314248 | A1 | 12/2008 | Peteln | |
| 2015/0367372 | A1 | 12/2015 | Roeckle et al. | |
| 2016/0023231 | A1 | 1/2016 | Schmeinck et al. | |
| 2017/0136483 | A1 | 5/2017 | Slama et al. | |
| 2019/0247878 | A1 | 8/2019 | Röckle | |
| 2020/0047097 | A1 * | 2/2020 | Knaus | B01D 45/08 |

FOREIGN PATENT DOCUMENTS

| | | |
|---|---|---|
| DE | 102015202257 A1 | 8/2016 |
| DE | 102015015234 A1 | 6/2017 |
| DE | 102017116663 A1 | 1/2019 |
| WO | 2019020308 A1 | 1/2019 |

* cited by examiner

FILTERING APPARATUS WITH AT LEAST ONE FILTER UNIT

BACKGROUND OF THE INVENTION

The invention relates generally to filtration of a gas stream, and more particularly to removal of particulates suspended in a gas stream by impacting the particles against surfaces to which the particles may adhere.

Automotive, automotive component and other industrial paint booths and similar environments involve spray paint and other materials passing through the air onto components, such as automobile bodies (see FIGS. 1-2). Much of the paint impacts the automobile body and adheres, but some of the paint passes the intended target and continues through the air until it strikes an object and adheres or cures and becomes a particle. The paint that passes its intended target is referred to as "overspray" and it is desirable to minimize overspray in order to minimize wasted paint, harm to the surrounding surfaces and the environment.

A common paint booth construction includes air inlets and outlets on walls, ceilings and/or floors to permit air to flow into the booth, past the automobile body at a consistent rate and through the outlets. Disposable or re-useable filters are positioned in the air passages downstream from the painting area so that as the air flows past the automobile body and the excess paint in the overspray is carried along, the paint-laden air enters the filters where most or all of the paint is removed. The paint is typically removed by impingement and interception of the particles on a surface, not usually by straining the paint particles out of the air or diffusion as are more common when removing dust and other small particles during heating, ventilation and air conditioning (HVAC) filtration in homes, offices and other buildings. In a prior art paint booth design, which is shown in FIG. 1, paint is sprayed onto an automobile body 1 while air passes toward the floor where air outlets receive the paint-laden overspray air 2 and guide it through a bank of filters 3.

The filtration system shown in FIGS. 1-2 is sold under the name "Eisenmann E-Cube." A video showing the removal and insertion of a prior art filter in the Eisenmann E-Cube system may be found at https://www.youtube.com/watch?v=9htUQSUgDYc. An automobile is painted in the spray booth 1, and overspray air 2 is drawn downward toward a plurality of disposable filter modules 3. The overspray air passes through the filter modules 3 and the paint contained therein is removed, thereby permitting the air to be guided back to the paint booth, passed to the outdoors or passed through another filtration system. Workers remove and discard each of the filter modules 3 once they reach the end of their useful life, and replace them with similar unused filter modules.

Filters used with conventional paint booths, such as the one shown in FIGS. 1 and 2, have a construction that permits removal of substantial amounts of paint before the filter's capacity for receiving paint ends. It is not uncommon for 40-80 lbs. of paint to be removed by one filter that weighs less than 100 lbs. when new. Nevertheless, the filters conventionally used in spray booths are in need of improvement at least regarding the amount of paint or other materials that they retain prior to replacement.

BRIEF SUMMARY OF THE INVENTION

Disclosed herein is a filtering apparatus having a housing with a top plate disposed at a significant angle to incoming overspray air to accelerate and guide the paint-laden air. It is contemplated to have an angle of about 24 degrees, and most preferably in a range from about 15 to about 45 degrees. With such a construction, the larger solids in the overspray air tend to collect on the top plate or impact the upstream wall because such large solids have too much momentum or inertia to make a turn to enter filter units disposed downstream of the top plate. Lighter solids turn with the air and enter the filtering material of the filter units to be removed by interception or impingement. There may be an overhang of the angled top plate upstream of the most upstream portion of the filter units. So as the air and particles flow down through an entry opening, they do not make a 90 degree turn into the filter units, and so there is an overshot by the paint particles past the top filtration material of the filter units. This allows air to have a path through the upper filtration media until that's the only portion that is unblocked by paint, which is near the end of the filter's service life.

The top plate directs the air upstream and receives paint particles, and therefore serves as a filter. The impact of the particles on, and adhesion to, the wall removes the paint from the air, and therefore the wall serves as a filter. The angled top plate may overhang the filters to prevent dripping paint from immediately entering the filter units, and the angle of the top plate directs the air away from the filters so that the larger particles in the overspray air impact the wall and adhere.

Disclosed herein is a filtering apparatus comprising an elongated housing configured to receive overspray air along an entry flow path. The entry flow path is substantially parallel to the length of the housing. The elongated housing guides the overspray air along an exit flow path that is transverse to the entry flow path. The housing is defined by at least an upstream sidewall, lateral sidewalls and a downstream sidewall. The downstream sidewall has an opening through which the overspray air exits the housing. A top plate is mounted to the housing and has an overspray-receiving surface toward which overspray air in the entry flow path is directed. An entry opening is defined by the upstream sidewall, the lateral sidewalls and an edge of the top plate that is closest to the upstream sidewall. The top plate is disposed at an angle to the entry flow path for receiving the entry air flow and guiding it through the entry opening. At least one filter unit is removably-mounted in the housing along the exit flow path on an opposite side of the top plate from the paint-receiving surface, the at least one filter unit is configured to receive the overspray air along the exit flow path.

In some embodiments, the top plate is disposed at an angle to the entry flow path and/or the upstream sidewall of between about 15 and about 45 degrees. In some embodiments, the overspray-receiving surface of the top plate has no substantial openings that would permit overspray air to penetrate the top plate. In some embodiments, the at least one filter unit extends filtration media, having gaps no larger than one inch, across the entire exit flow path. In some embodiments, the at least one filter unit has an upstream face, and at least a portion of the upstream face that is closest to the edge of the top plate is disposed downstream of the edge of the top plate, thereby mitigating flow of material from the overspray-receiving surface to the filter unit.

In some embodiments, a lower plate is disposed adjacent to, and spaced from, the top plate, thereby forming an upper chamber between the top plate and the lower plate. In some embodiments, a first overspray-receiving shield is removably mounted over at least a portion of the overspray-receiving surface of the top plate and a second overspray-receiving shield is removably mounted over at least a portion of a surface of the upstream sidewall that faces the top plate. In some embodiments, the at least one filter unit has reinforcement panels mounted in opposite ends thereof. In some embodiments, the overspray-receiving surface of the top plate has a layer that disrupts smooth flow over the top plate. In some embodiments, at least one of the sidewalls has a lateral edge folded over at least one adjacent sidewall, thereby registering an edge of said at least one adjacent sidewall with a respective inside corner formed by the folded lateral edge. In some embodiments, a floor is pivotably mounted to the sidewalls.

The at least one filter unit may include a first filter unit, a second filter unit interposed between the first filter unit and the top plate, and at least one support linked to the second filter unit that transfers at least some of the second filter unit's weight away from the first filter unit. The at least one support may be interposed between the first and second filter units. The at least one support may attach to one of the filter units and at least one of the lateral sidewalls.

Figure 1:
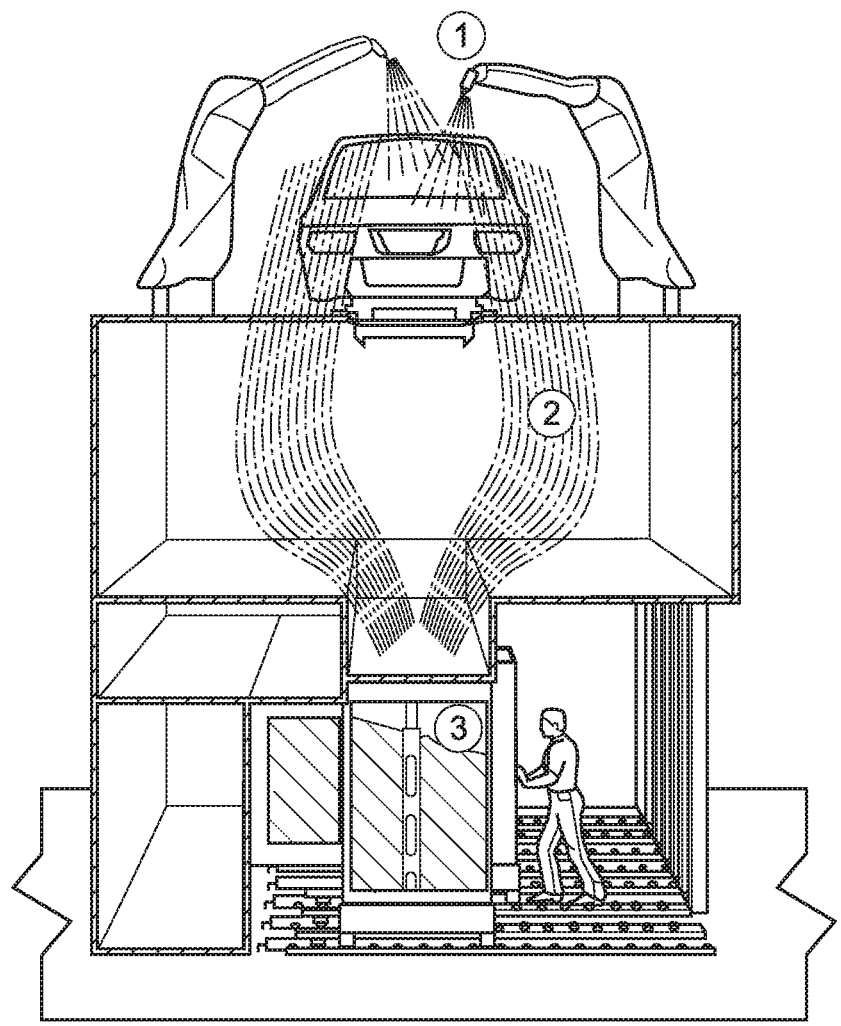
FIG. 1 is a schematic section view in perspective illustrating a prior art paint booth and filtration system.
Figure 2:
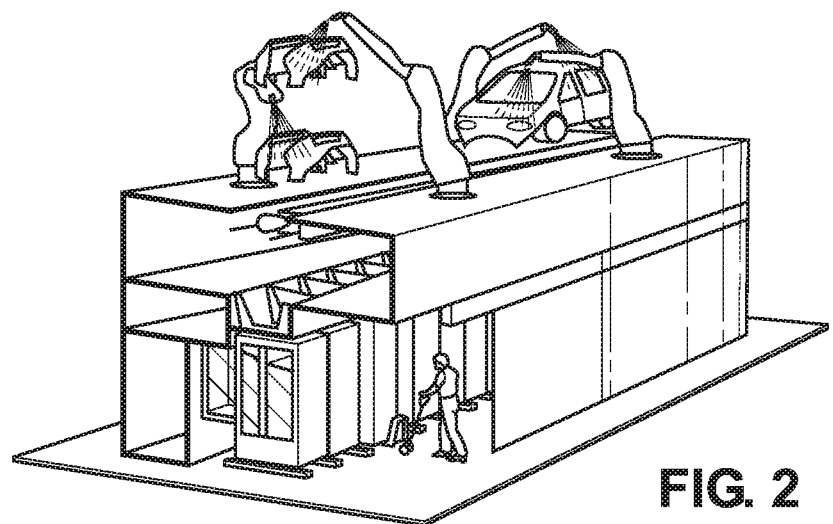
FIG. 2 is a view in perspective illustrating the prior art system of FIG. 1.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 3:
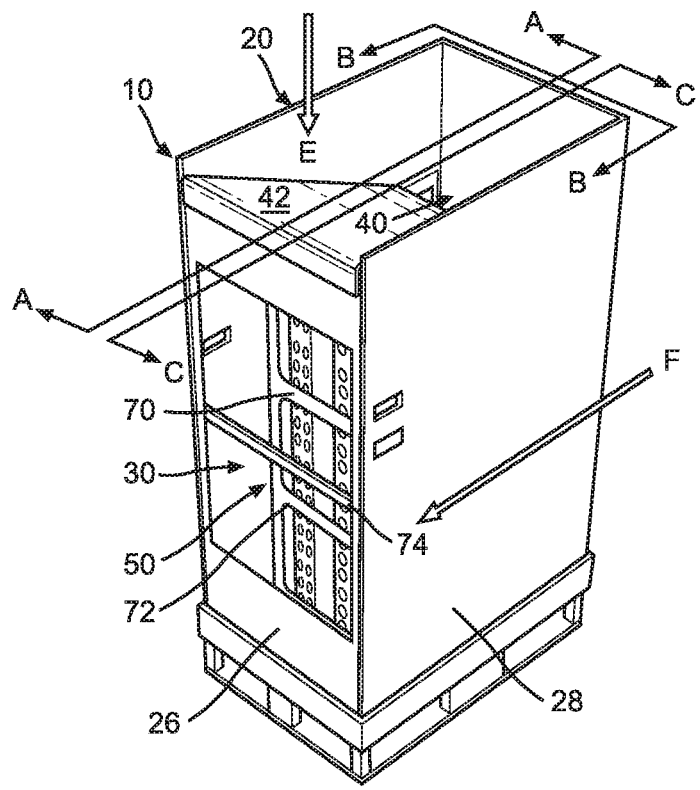
FIG. 3 is a view in perspective illustrating an embodiment of the present invention.
Figure 4:
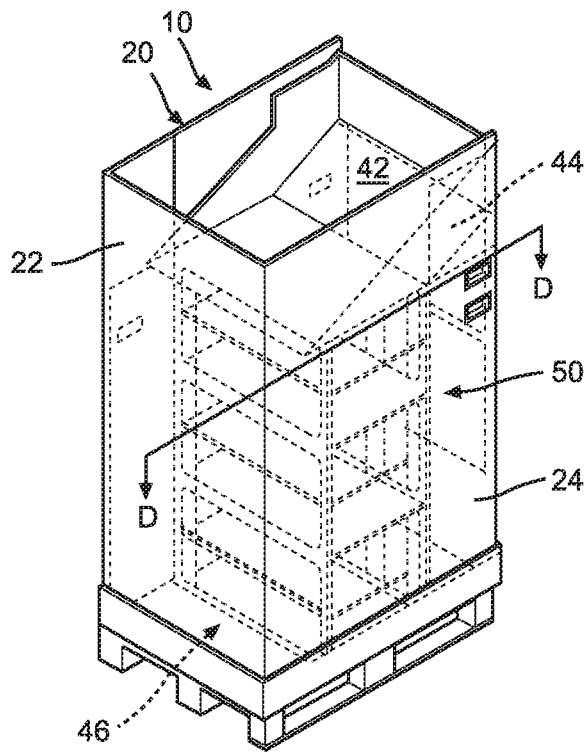
FIG. 4 is a schematic view in perspective illustrating the embodiment of FIG. 3 with translucent walls so the interior is visible.

The filtering apparatuses disclosed herein may be used with a filtration system disclosed in United States Patent Application Publication No. 2020/0047097, which is incorporated herein by reference, instead of the filter module disclosed therein. The filtering apparatus 10 shown in FIGS. 3-6 has a housing 20 formed by the sidewalls 22, 24, 26, and 28, which may be vertically-oriented in the orientation shown in FIGS. 3-6. A floor 46 may be attached to the lower ends of the sidewalls 22-28, in the orientation shown in FIG. 4, and may form a component of the housing 20. The housing 20 is elongated, meaning its length is greater than its width and greater than its thickness. In the orientation of FIGS. 3-4, the housing length is vertical, the width and length are horizontal with the width being along the sidewall 28 and the thickness being along the sidewall 26. Other embodiments or orientations may have a length that is aligned along the horizontal direction or may be angled between vertical and horizontal.

A top plate 42 is disposed between, and may mount to, the sidewalls 24 and 28, and may mount to the sidewall 26. The top plate 42 extends from the downstream sidewall 26 toward the upstream sidewall 22 without reaching the sidewall 22, thereby forming a void between an edge 43 of the top plate 42 and the sidewall 22. The void, referred to herein as the entry opening 40, may be about four to about ten inches wide for a housing that is about 46 inches wide from the sidewall 22 to the sidewall 26. In a preferred embodiment, the entry opening 40 may be about seven inches wide. The thickness of the entry opening 40 may be approximately the same as the thickness of the housing 20, which is the distance between the sidewalls 24 and 28. Thus, the entry opening 40 void is formed between, and defined by, the lateral sidewalls 24 and 28, and between the downstream face of the entry sidewall 22 and the upstream edge 43 of the top plate 42.

The sidewalls 22-28, floor 46 and top plate 42 may define a lower chamber 50. In an operable orientation shown in FIGS. 3-4, overspray air (typically air laden with paint and/or any solids or liquids suspended therein) approaches the housing 10 in a path directed along the length of the housing 10, corresponding generally to the arrow, E, shown in FIG. 3. In the orientation of FIG. 3, the air enters the apparatus 10 in a downwardly-directed vertical path. In general, overspray air passes the entry opening 40 into the lower chamber 50, and then is guided along another, transverse path (referred to herein as the "exit path") in a generally horizontal direction (in the orientation of FIG. 3) from the sidewall 22 toward the sidewall 26, corresponding generally to the arrow, F. The exit path F flows in a direction from the upstream sidewall 22 toward the downstream sidewall 26, which is in a direction referred to as "downstream" through the housing 20. The terms "upstream" and "downstream" designate positions or movement in relation to the direction of air flow along the exit path, F, a direction that is generally from the sidewall 22 to the sidewall 26. Thus, overspray air is referred to as flowing downstream through the lower chamber 50 after the overspray air has entered the lower chamber 50 and until the air passes through the exit opening 30.

In the embodiment of FIGS. 3-4, the sidewall 22 may be at an upstream end of the lower chamber 50 and the sidewall 26 may be at a downstream end of the lower chamber 50. The entry opening 40 forms the entry point of overspray air or other gas into the lower chamber 50. The exit opening 30, which may include multiple openings through the sidewall 26 and preferably does not substantially resist the passage of gas, forms the exit point of air from the lower chamber 50. The entry opening 40 is thus where overspray air preferably enters the lower chamber 50, and the exit opening 30 is where air preferably exits the lower chamber 50.

A lower plate 44 may extend upstream from the sidewall 26 toward the sidewall 22 and terminate near the edge 43. The lower plate 44 may extend at an angle to the sidewall 26 similar to that of the top plate 42, but different angles are contemplated. The lower plate 44 is disposed between, and may attach to, the lateral sidewalls 24 and 28, and may define an upper boundary of the lower chamber 50. The lower chamber 50 is generally defined by the inner surfaces of the sidewalls 22-28, the lower surface of the lower plate 44 (when used), the lower surface of the lower plate extension 44b (when used), and the upper surface of the floor 46.

The lower plate 44 may attach to the sidewall 26, possibly near the top of the exit opening 30. A lower plate extension 44b may extend substantially perpendicularly, although different angles are contemplated, to the sidewall 26 from the upstream edge of the lower plate 44 to the edge 43 of the upper plate 42. A portion of the housing of the filter unit 60 may form a portion of the lower plate extension 44b. A portion of the sidewall 26 above (in the FIG. 6 orientation) the exit opening 30 may constitute a boundary of an upper chamber 48, as may the sidewalls 24 and 28, the top plate 42, the lower plate 44 and the lower plate extension 44b.

The upper chamber 48 boundaries may reduce the net pneumatic force applied to the top plate 42 by overspray air forced into the top of the housing 20 and flowing out of the exit opening 30. The overspray air entering the apparatus 10 may have a higher pressure than the air exiting the apparatus 10 due to resistance to air flow through the apparatus 10. With the upper chamber 48 formed by the structures described above, the lower plate 44 and other walls defining the upper chamber 48 reduce any deforming effect that this pressure differential would otherwise have on the top plate 42 were it not for the lower plate 44 and other walls that define the upper chamber 48. Because of the walls of the upper chamber 48, there is one pressure on the overspray-receiving surface of the top plate 42, a second pressure on the opposite side of the top plate 42, which is the same as the pressure on the top of the lower plate 44 across the upper chamber 48. There is a third pressure on the lower surface of the lower plate 44 due to air leaving the apparatus 10. Because of the upper chamber 48, the entry pressure and the exit pressure are not the pressures applied on opposite sides of the top plate 42. Instead, there is a pressure in the upper chamber 48 that causes the pressure differential over the top plate 42 to be less extreme than it would be without the other walls that form the upper chamber 48. Thus, the top plate 42 is supported, as it were, by the lower plate 44 and other walls of the upper chamber 48, which prevents the top plate 42 from flexing like a membrane when overspray air is forced into the apparatus 10 during use.

Another use for the upper chamber 48 and its walls is as a receptacle for any pieces removed from the housing 20 sidewalls and the filter units 60-64. These waste pieces may be placed in the upper chamber 48 during assembly of the filtering apparatus 10 and before the upper chamber 48 is sealed. The upper chamber 48 permits such waste to be stored out of the way and then be incinerated or discarded with the rest of the filtering apparatus 10 after use.

The housing 20 and other components may be made of paper, paperboard, corrugated cardboard, plastic, metal, wood, composite or any other suitable material. In one embodiment, the sidewalls 22-28, top plate 42, lower plate 44 and floor 46 are all made of corrugated paperboard. The filter modules 60-64 may also be made of paper, such as corrugated paperboard used as the housing and slit and expanded paper used as a filtration medium. Thus, virtually all components of the filtering apparatus 10 may be manufactured out of one or more sheets that are folded and fixed at ends and edges. Glue, tape, staples or other fasteners may be used to fasten the edges together to make the apparatus 10 substantially airtight for air flowing in the entry opening 40 and out the exit opening 30. Air or other gas that flows into the entry opening 40 may preferably only exit the housing 20 through the exit opening 30. No substantial amount of air is able to penetrate through the top plate 42, the sidewalls 22-28, the floor 46 and the other solid components of the housing 20. Of course, filtration media may be penetrated in order to remove particles from the air. Depending on the material and the fasteners used, it is possible that small amounts of air may enter or exit the housing 20 through openings in the housing 20 where seals are imperfectly formed. Nevertheless, substantially all air that enters the apparatus 10 passes through the exit opening 30, and no substantial amount of air flows along any other flow paths than those described herein.

At least one filter unit 60 may be disposed in the lower chamber 50 in order to remove paint, adhesive or any other solids or liquids that are suspended in the overspray air that flows along the exit path, F. One or more filter units may be one of the filter units described in U.S. Pat. No. 9,555,358 to Haufe and/or one of the filter units described in U.S. Pat. No. 9,993,835 to Slama, both of which are incorporated herein by reference. The filter unit 60 may alternatively be a modified version of one of the above-referenced filter units, or may use other filter technologies, including without limitation integrated pockets, pre-filter media, roll media, and/or a single large Z-fold.

Figure 5:
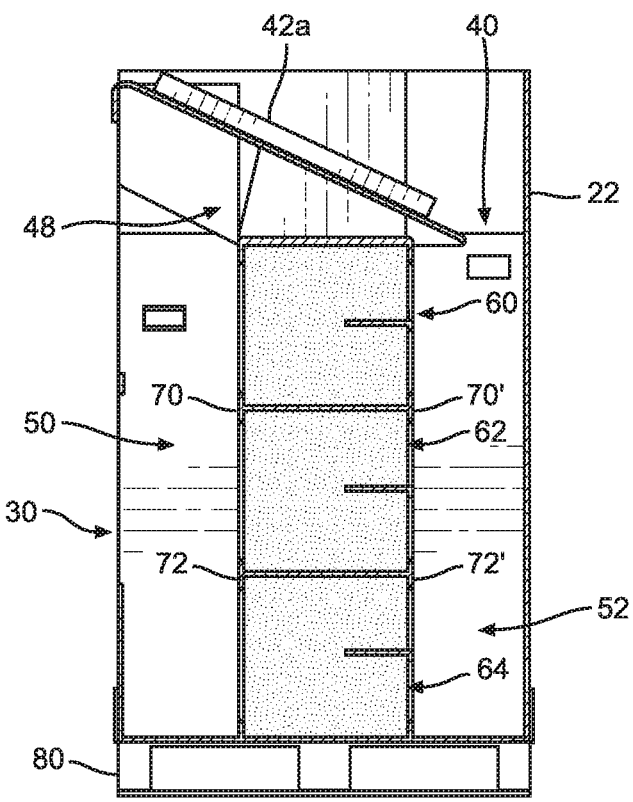
FIG. 5 is a side view in section illustrating the embodiment of FIG. 3 through the line A-A.
Figure 6:
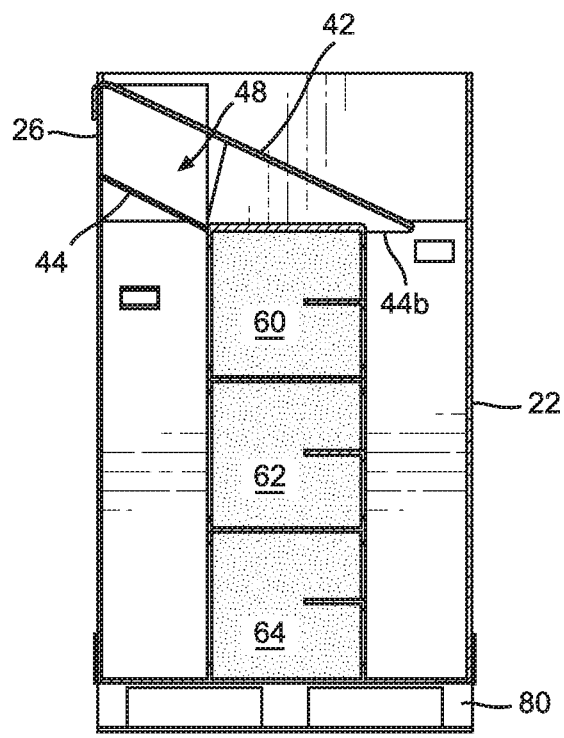
FIG. 6 is a side view in section illustrating the embodiment of FIG. 3 through the line A-A.

In one embodiment, there are multiple filter units 60, 62 and 64 disposed in the lower chamber 50 by stacking the filter units 60-64 vertically, in the orientation of FIG. 5. In such a configuration, the filter unit 64 may rest upon the floor 46, the bottom of the filter unit 62 may rest on the top of the filter unit 64, and the bottom of the filter unit 60 may rest on the top of the filter unit 62. In this configuration, the weight of the filter unit 64 rests upon the floor 46 and is supported vertically by the floor 46 alone, the weight of the filter unit 62 is supported vertically by the filter unit 64 and the floor 46, and the weight of the filter unit 60 is supported vertically by the filter unit 62, the filter unit 64 and the floor 46. It is contemplated to alternatively support each of the filter units 60 and 62 by supports, such as supports attached to the sidewalls 24 and 28 and/or resting upon the floor 46. Nevertheless, the embodiment shown in FIGS. 3-6 has no such support for the filter units 60-64 except the filter unit(s) below and the floor 46.

Figure 7:
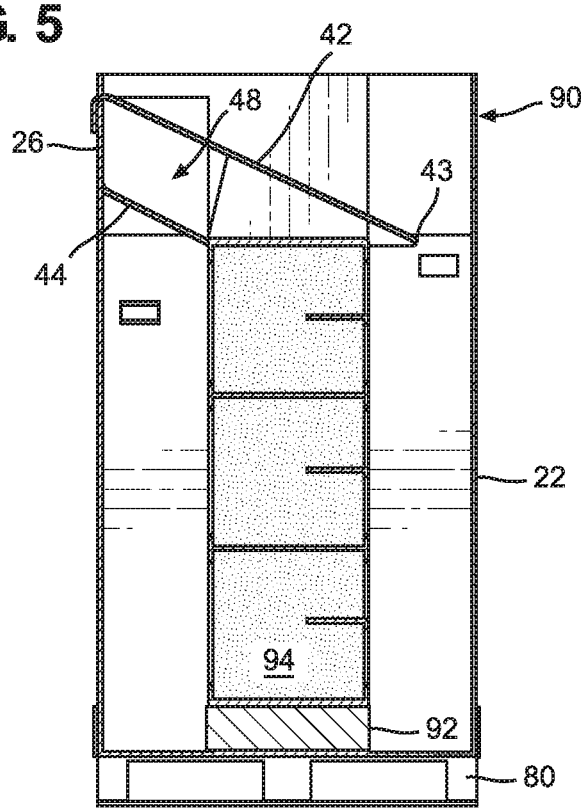
FIG. 7 is a side view in section illustrating an alternative embodiment of the invention.

Although the filters 60-64 are discussed above as resting on the upwardly-facing surface of the floor 46, the filters 60-64 may be raised up above the floor 46 so that paint or other material that is removed from the overspray air does not overflow into the lowest filter, such as the filter 64, if the paint builds up in the bottom of the lower chamber 50. As an example shown in FIG. 7, a filtering apparatus 90 that is similar to the filtering apparatus 10 disposes a spacer 92 between the floor and the downwardly-facing surface of the lowest filter 94. The spacer 92 may be made of the same material as the filter units' frame, the apparatus 90 or another suitable material, and may rest upon the upwardly-facing surface of the floor with the filter 94 resting thereupon. The spacer 92 may be about one-tenth to about the height of the filter 94, such as about twenty inches high, and may be a corrugated paperboard box. The spacer 92 increases the likelihood that paint only flows into the lowest filter unit 94 through the air, and not by overflowing the front face frame of the filter unit.

Figure 13:
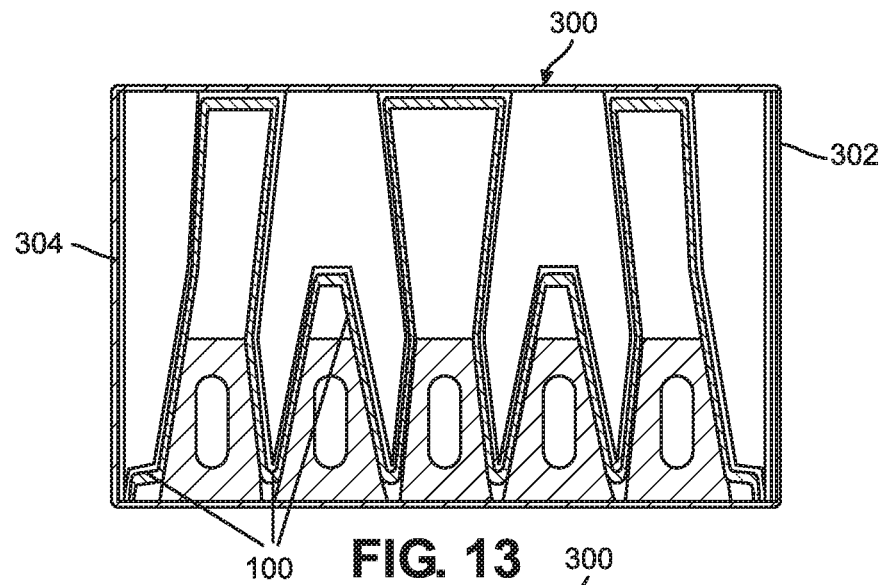
FIG. 13 is a schematic top view in section illustrating a first embodiment of a filter sub-component.

Each of the filter units 60-64 of FIGS. 3-6 may have a filtration media that extends entirely across the respective filter unit and extends from the bottom to the top of the respective filter unit, thereby forcing any overspray air that enters the lower chamber 50 to pass through the filtration media in order to exit the apparatus 10. In a preferred embodiment, the filtration media 100 (see FIG. 13) is slit and expanded paper, but it could be any other suitable media. Furthermore, the filtration media preferably has small openings through which the overspray air must pass in order to pass through the filters. The openings are preferably fractions of an inch in size, but in general are no larger than one inch in any dimension. More preferably, the openings are substantially smaller than one inch due to the overlapping of slit and expanded paper media that results in the largest opening being less than 0.1 inch. Thus, overspray air that passes through the lower chamber 50 may not pass around the filtration media through openings that are more than one inch wide or tall, and typically are a fraction of an inch. Instead, the overspray air passes through these small openings in the filtration media to ensure removal of most or all suspended particles in the overspray air by the particles impacting the filtration media and adhering.

It is contemplated to dispose structures in the lower chamber 50 that support the filters 60-64 in the horizontal direction, even while those same structures may not support the filters 60-64 in the vertical direction. As an example shown in FIGS. 3 and 6, the lateral strips 70, 70', 72 and 72' may be attached at their ends to the sidewalls 24 and 28, and extend horizontally (in the orientation of FIGS. 3 and 6) across the lower chamber 50. Alternatively, the lateral strips 70, 70', 72 and 72' may attach only at their sides to the adjacent filter units 60-64 in the manner of tape, thereby connecting the filter units 60-64 together. The strips 70 and 70' are disposed where the lower end of the filter unit 60 and the upper end of the filter unit 62 meet. The strip 70 is an obstacle to downstream movement of the filter units 60 and 62, and the strips 70 and 70' are obstacles to downstream movement of air between the filter units 60 and 62. The strip 72 similarly obstructs downstream movement of the filter units 62 and 64, and the strips 72 and 72' obstruct air from passing between the filter units 62 and 64. The strips 70, 70', 72 and 72' reduce or prevent air movement between their respective filter units. Additional or alternative strips may consist of tape attached to both the filter units 60-64 and the sidewalls 24 and 28, and/or the top plate 42 and/or the lower plate 44 to reduce or prevent air movement between the filter units and the sidewalls/plates.

A pallet 80 may be mounted to the underside of the floor 46, and may be attached thereto by fasteners, including screws, stables, adhesives, or any other suitable fastener. The pallet 80 permits a user to simply insert the conventional forks of a pallet jack, a lift-truck, a manual lift or similar devices under the apparatus 10 to move, such as to install and remove the apparatus 10 from operation.

Figure 8:
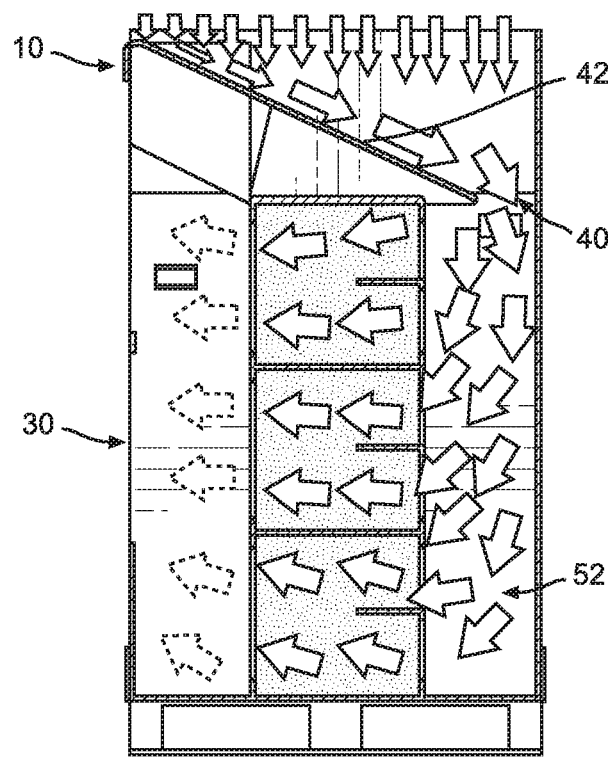
FIG. 8 is a schematic view illustrating the illustration of FIG. 6 with arrows showing the flow of paint-laden air.

When in an operable orientation, as shown in FIG. 8, the filtering apparatus 10 may function in the following manner. The air that enters the apparatus 10 contains a substantial amount of paint or other suspended material, which will be referred to herein as paint, even though it can be other materials. Paint is a common material used with the apparatus 10, so it will be used as an example. Overspray air enters the apparatus 10 in an entry air direction, as shown by the uppermost arrows in FIG. 8, which are aligned generally parallel to the sidewalls 22-28. These arrows are vertically directed and point downwardly in the FIG. 8 orientation. The overspray air enters the apparatus 10 across the entire thickness (toward and away from the viewer in FIG. 8) of the apparatus 10, even though the single row of arrows in FIG. 8 may imply entry only along the entire width (left to right in FIG. 8).

After entering the apparatus 10, the downwardly flowing overspray air flows into the entry opening 40. While the overspray air entering the apparatus 10 above the entry opening 40 at the upstream end (the right side in FIG. 8) flows downwardly through the entry opening 40 without changing direction substantially, the air entering the apparatus 10 above the top plate 42 (the left side in FIG. 8) is guided toward the entry opening 40 by the top plate 42. The top plate 42 is angled relative to the direction of the incoming air to form an obstruction to the overspray air, and the top plate 42 guides the air in a downward direction that also has an upstream component toward the entry opening 40. The paint in the overspray air does not always follow the same path as the air, because the heavier paint particles cannot turn upstream, as guided by the top plate 42, as rapidly as the much less massive air due to momentum and inertia. Therefore, a substantial amount of the paint in the overspray air may impact and adhere to the overspray-receiving surface of the top plate 42.

In some embodiments, the overspray-receiving surface of the top plate 42 may be smooth. In other embodiments, this surface may be roughened, such as by adhering particulate, slit-and-expanded paper 42a (see FIG. 5) or any other material that disturbs the air flow along the surface to thereby cause more paint to adhere to the top plate 42. Regardless of the top plate's construction, all of the downwardly-directed air flowing into the apparatus 10 flows through the entry opening 40. The overspray air directly above the opening 40 remains essentially on its downward-only path through the opening 40. The remainder flows along a downward and upstream path as guided by the top plate 42 and shown by the arrows of FIG. 8, as will be understood by the person of ordinary skill.

The pressure of the air flowing through the entry opening 40 is elevated above the pressure of the air that first enters the apparatus 10, and this is due to the compression that occurs when the air volume that enters the apparatus 10 is forced to flow through the smaller entry opening 40. The area of the entry opening 40 is substantially smaller than the cross-sectional area of the apparatus 10 (when viewed from the top in FIG. 12). For example, the total cross-sectional area (width multiplied by thickness) of the apparatus 10 may be 3-6 times the area of the entry opening 40 or more. In one embodiment the cross-sectional area of the apparatus 10 is 4.5 times greater than the area of the entry opening 40. Forcing the air that enters the larger opening of the apparatus 10 through the smaller entry opening 40 compresses the air, thereby accelerating it (increasing its velocity) near, at and immediately below the entry opening 40, which is illustrated by larger (longer and/or wider) arrows.

After passing through the entry opening 40 at a higher speed than it entered the apparatus 10, the overspray air enters the entry chamber 52, which is a sub-portion of the lower chamber 50 that is upstream of the filter units 60-64. The cross-sectional area of the entry chamber 52, which is formed along a plane extending perpendicularly to the exit flow path, F, is larger than the cross-sectional area of the entry opening 40. This differential permits the overspray air to slow once it passes through the entry opening 40 and before it begins to flow through the filters 60-64 and out of the exit opening 30. Nevertheless, the particles in the overspray air do not slow as rapidly as the air due to greater mass of the particles, with an effect on the paint as described below. The exit opening 30 may have approximately the same cross-sectional area as the cross-sectional area the overspray air encounters when it first enters the filtering apparatus 10. Therefore, in some embodiments, the velocity and pressure of the air entering the filtering apparatus 10 may be substantially similar to the velocity and pressure of the air passing through the exit opening 30.

As noted above, the velocity of the overspray air increases as it approaches the entry opening 40. Of course, an increase in air velocity increases the velocity of the paint and/or other particles that are suspended in the air. Thus, as the overspray air passes through and flows away from the entry opening 40, many of the particles remaining in the air that flows upstream along the top plate 42 are not able to turn downwardly when they approach the entry opening 40 due to momentum and inertia. Therefore, a substantial amount of the paint in the upstream-directed overspray air may impact and adhere to the sidewall 22 above the entry opening 40. Air that continues through the entry opening 40 into the entry chamber 52, which has just been accelerated as it passes through the entry opening 40, may contain additional paint particles that are not able to turn as rapidly downwardly and toward the filters 60-64 as the less massive air as the air is guided by the sidewalls defining the entry chamber 52. Instead, a great portion of the paint particles may impact the inner surface of the sidewall 22 and the floor 46 and adhere because they cannot turn immediately downstream as some of the air must after it passes through the entry opening 40 (as shown by the arrows). The paint remaining in the overspray air that turns downstream and passes through the filters 60-64 is removed by the filters 60-64 in a known manner so that as the air exits the exit opening 30 it is substantially cleaned of all paint particles.

Figure 9:
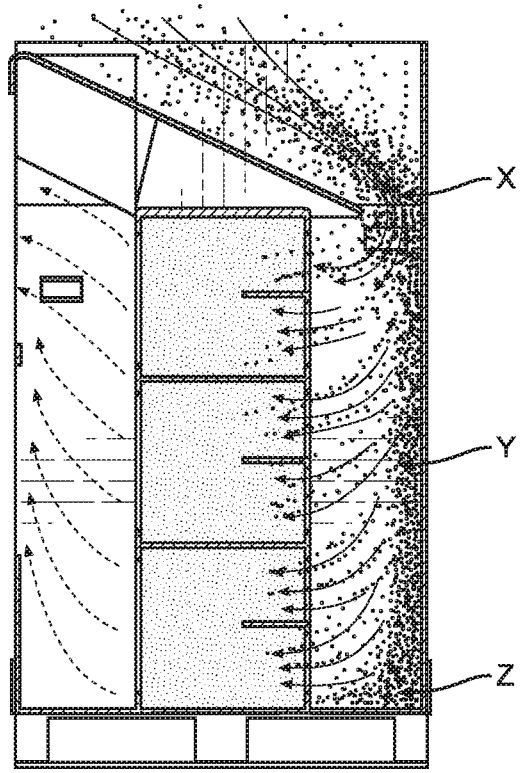
FIG. 9 is a schematic view illustrating the illustration of FIG. 5 with lines showing the flow of paint-laden air and the locations where paint may collect during use.

The paint that is removed from the overspray air that passes through the apparatus 10 may be illustrated in FIG. 9, where the more dense portions X near the entry opening 40, Y on the sidewall 22 and Z on the floor 46 indicate a greater amount of paint that deposits on the corresponding surfaces. The remaining lines illustrate the path of the overspray air that is paint-laden, and practically all paint is effectively removed from the air before it exits the filters 60-64. In conventional fashion, the air exiting the apparatus 10 may be returned to the paint booth, it may be further treated or it may be exhausted to the outdoors.

Thus, the overspray air that flows into the apparatus 10 deposits paint or other material on the overspray-receiving surface of the top plate 42 that guides the incoming overspray air. Much of the remaining paint is deposited on the sidewall 22 and on the floor 46 because the overspray air that is accelerated downwardly and upstream slows and turns downstream rapidly upon entry to the chamber 50, but the paint cannot slow and turn as rapidly due to momentum and inertia. Thus, the paint is deposited on the surfaces it strikes. The filter units 60-64 remove the remaining paint from the overspray air as it flows downstream. The overspray air thus deposits much of the suspended paint on solid surfaces prior to reaching the filtration media of the filter units 60-64, and this permits the filtering apparatus 10 to last much longer than prior art embodiments. Upon reaching the end of its useful lifetime, the apparatus 10 is removed from service and replaced by a similar filtering apparatus.

Figure 10:
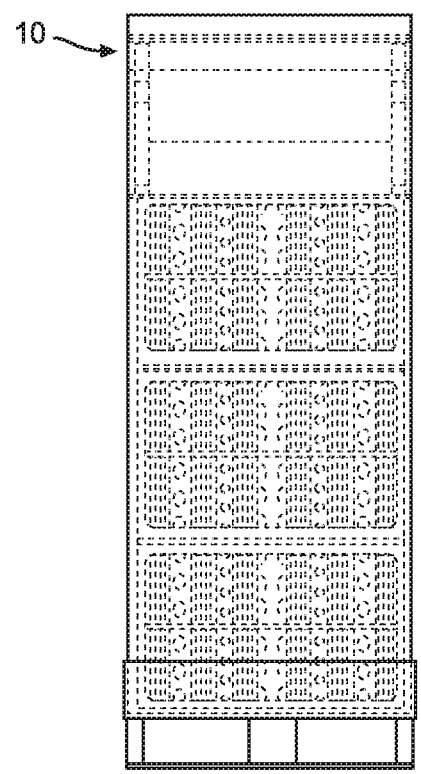
FIG. 10 is a side view in section of the embodiment of FIG. 3 through the line B-B.
Figure 11:
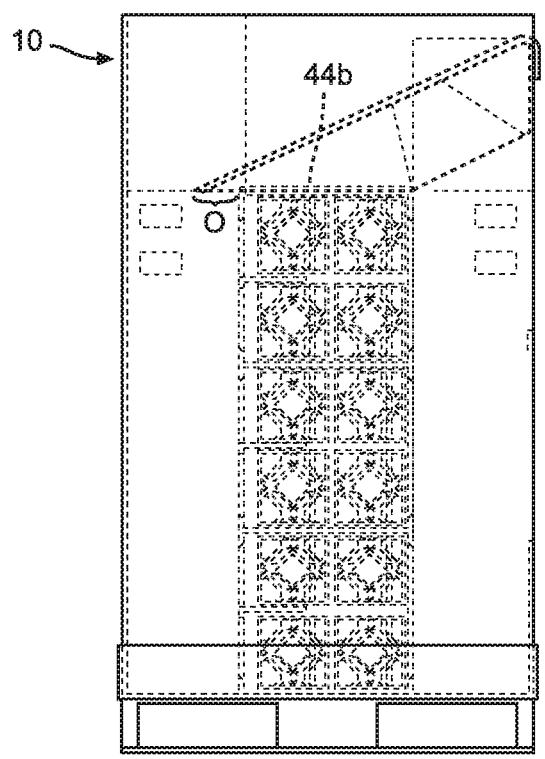
FIG. 11 is a side view in section of the embodiment of FIG. 3 through the line C-C.
Figure 12:
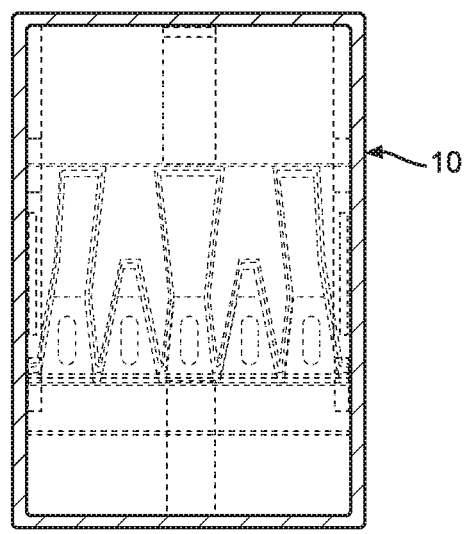
FIG. 12 is a top view in section of the embodiment of FIG. 4 through the line D-D.

A notable feature of the filtering apparatus 10 is that the top plate 42 overhangs the filters 60-64 by at least about one inch, more preferably about two to four inches, and as much as twelve inches for a filtration apparatus 10 with the dimensions shown in FIGS. 10-12. The overhanging portion of the top plate 42 is the portion that extends upstream from the upstream face of the top filter unit, and this overhanging portion is denoted by the letter O in FIG. 11. The lower plate extension 44b extends between the edge 43 of the top plate 42 and the lower edge of the lower plate 44. It is contemplated that the lower plate extension 44b may extend only from the edge 43 to the upstream face of the filter unit 60. This would result in the lower plate extension 44b forming the overhang in its entirety, with the top of the filter unit 60 contacting the lower edge of the lower plate 44 and serving as the remainder of the lower plate extension 44b seen in the illustrations.

With the overhang, O, any paint dripping over the edge 43 is likely to form one or more thin strands of paint that will not likely be drawn downstream into one of the filter units 60-64. The strand will form in the space upstream of the filter units and hang down instead of flowing downwardly, as in the prior art, and entering the filter units. The overhanging portion of the top plate is effective to prevent paint from entering the filter units because the lower plate extension 44b that extends from the upstream face of the filter 60 to the edge 43 of the top plate 42 does not have a structure with a substantial vertical component to flow down. A substantial vertical component, which is defined as more than about five degrees from horizontal, would cause the paint that impacts the top plate 42 and runs downwardly over the edge 43 to be much more likely to flow downstream into the filters, thereby blocking them. Avoiding this, as the invention does, substantially reduces the amount of paint that flows into the filter units.

In the embodiment of FIGS. 3-6, the entry opening 40 that is defined by the span between the sidewall 22, the edge 43, the sidewall 24 and the sidewall 28 is the largest it will be during the service life of the filter apparatus 10 prior to use of the apparatus 10. Further, it is a size that is specific to the performance desired of the filtering apparatus 10. In one example, the acceleration of the airflow is proportional to the overall cross-sectional area of the filtering apparatus 10 (width×thickness) divided by the area of the entry opening 40. In the embodiment of FIGS. 3-6, this is about 4.5. The airflow in the systems in which the filtering apparatus 10 will be used have a speed of about 2.5-3.0 m/s (500-600 FPM) for air first entering the filtering apparatus 10. Therefore, the velocity of the overspray air at the edge 43 of the top plate 42 is about 11.5 m/s (2250 fpm). The angle of the top plate 42 relative to the sidewall 22 (and the entry air path direction, E) may be about 24°, which results in a velocity component of about 10.5 m/s (2050 fpm) in the direction perpendicular to the sidewall 22 and about 4.5 m/s (900 fpm) in the direction parallel to the sidewall 22. This example is for the filtering apparatus 10 at initial state, which is before any paint or other material builds up on the top plate 42, sidewall 22, floor 46, etc. Once paint builds up on the top plate 42 and sidewall 22, the effective size of the entry opening 40 may grow smaller. When this happens, acceleration of the overspray air through the (now smaller) entry opening 40 increases in relation to the acceleration that occurred prior to paint building up.

When the acceleration through the entry opening 40 increases, the filtration material that is farther from the entry opening 40 has paint on it because some of the paint in the overspray air has made the turn downstream and impacted the corresponding (typically the lowest) filter unit. For areas such as this, less air can pass through the filtration material in the lower filter unit. However, when the acceleration becomes greater due to a smaller effective entry opening 40 as described above, it is even less likely that the paint-laden air will turn rapidly and flow into the filtration material closer to the entry opening 40. Thus, in the latter portion of the filter's life the paint-laden air moves faster through the entry opening 40, and so it is more likely to strike the upstream wall and the filter material farther from the entry opening 40 and less likely to strike the filtration media downstream of, and closer to, the entry opening 40. Instead, air that has been "filtered" by momentum causing the paint to strike and adhere to the sidewall 22 and floor 46 flows through the only (or least-resistance) path, which is through the filtration media closest to the entry opening 40. But this air is more filtered than even at the beginning of use of the filter due to the greater acceleration and removal of paint on the sidewall 22 and floor 46 later in the life of the filter. Thus, the filter material farthest from the entry opening 40 loads first, and the filtration material closest to the entry opening 40 is the last to load, thereby leaving space through the filtration media closest to the entry opening 40 where air can pass through until the life of the filter is expired.

Figure 17:
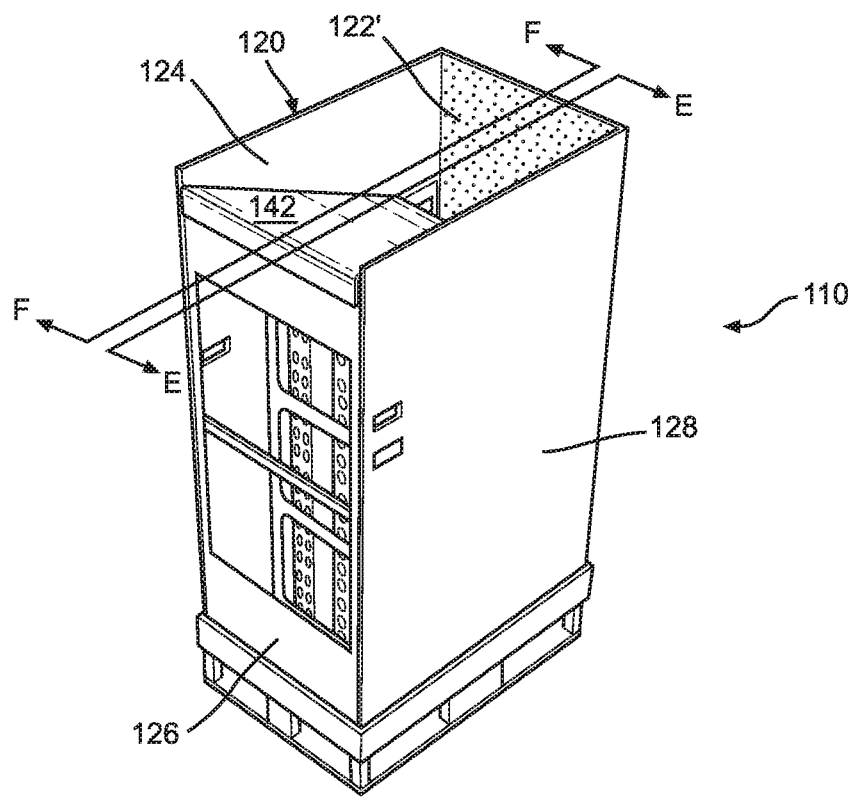
FIG. 17 is a view in perspective illustrating an alternative embodiment of the present invention.
Figure 18:
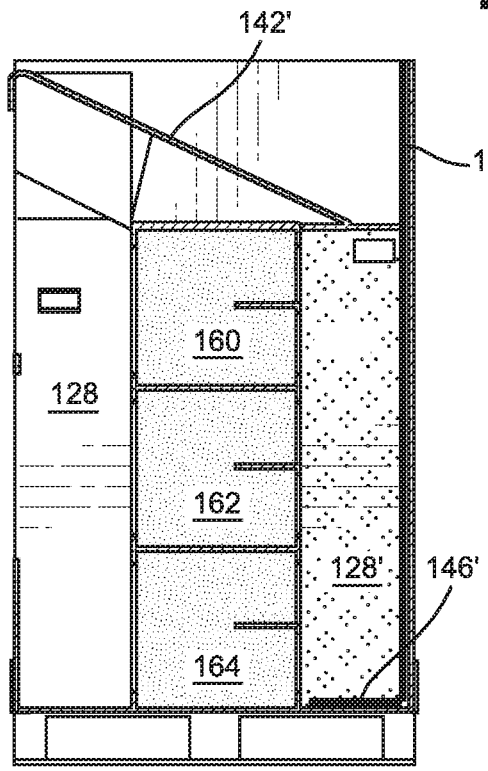
FIG. 18 is a side view in section of the embodiment of FIG. 17 through the line E-E.
Figure 19:
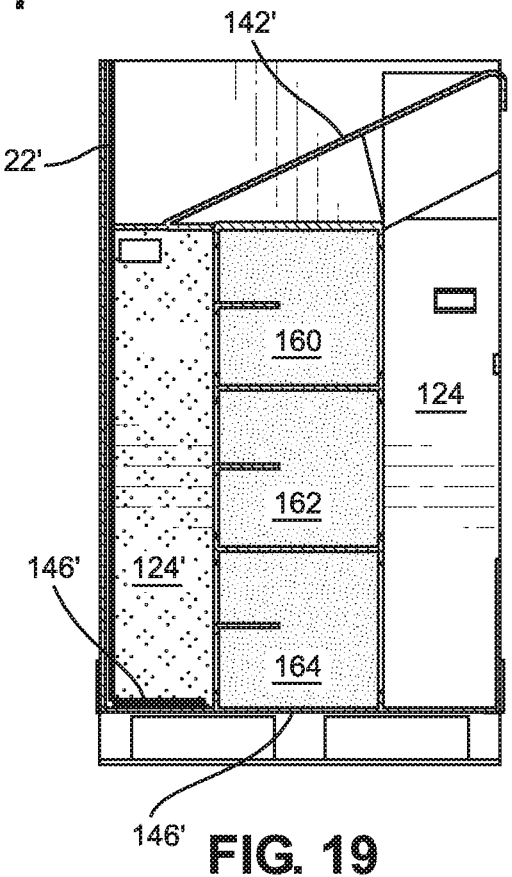
FIG. 19 is a side view in section of the embodiment of FIG. 17 through the line F-F.

The apparatus 10 may be made entirely of a single material. For example, the apparatus 10, including the sidewalls 22-28, top plate 42, lower plate 44 and floor 46 may be made of corrugated paperboard and fastened at edges in a conventional manner, such as with adhesive and/or other fasteners. The apparatus 10 may have supports of wood or other material that may be recycled or incinerated after use. As an alternative, some components, such as the housing 120 of an apparatus 110 (see FIGS. 17-19), may be made of one material, such as metal, plastic or any other suitable reusable material, and other components may be made of another disposable or recyclable material, such as paperboard or any other inexpensive material. In this embodiment, the metal components of the apparatus 110 may be re-used, and the paperboard components may be removably attached to the housing 120 so they may be replaced with new paperboard components. The removed components may be incinerated or discarded and the housing reused.

The housing 120 has sidewalls 122, 124, 126 and 128 that are made of metal, such as steel or aluminum sheet. The floor 146 and the top plate 142 may also be made of metal. The sidewall 122 may be mounted to the sidewall 124 with a hinge and to the sidewall 128 with a latch, which permits the sidewall 122 to function as a door that may be opened to access the chamber 150 of the housing 120 to insert and remove the filter units 160, 162 and 164 and any other replaceable components.

Replaceable overspray-receiving shields or plates may be removably mounted to the surfaces on which paint or other material suspended in the overspray air collects, including the top plate 142, the floor 146 and the sidewalls 122, 124 and 128. The plate 122' is mounted over at least a portion of the sidewall 122, the plates 124' and 128' are mounted over at least portions of the sidewalls 124 and 128, respectively, and the plate 146' is mounted over at least a portion of the floor 146. Thus, instead of paint in the overspray air collecting on the underlying metal surfaces, the paint collects on the removable shields or plates mounted thereon. The plates 122', 124', 128', 142' and 146' may be made of corrugated paperboard, wood, paper, plastic or any other suitable material, and may be fastened to the underlying metal surfaces by adhesive or any other fasteners, including screws, staples, specialized connectors or disposable rivets that extend through the plates and the underlying sidewalls. When the removable components of the filter apparatus 110 have reached the ends of their useful lives, the filters and the overspray-receiving shields may be removed from the housing 120 and replaced with unused similar components. The paint-covered components may be discarded or incinerated and the renewed filter apparatus 110 is placed back into service.

By using metal or another material for the housing 120, the whole structure is re-usable except for the components that receive substantial amounts of paint or other material. It is preferred that in all locations in which a substantial amount of paint contacts, such cardboard shields, plates or other material liners are fastened to the housing 120 in a manner that causes them to remain in place to collect the paint.

Figure 20:
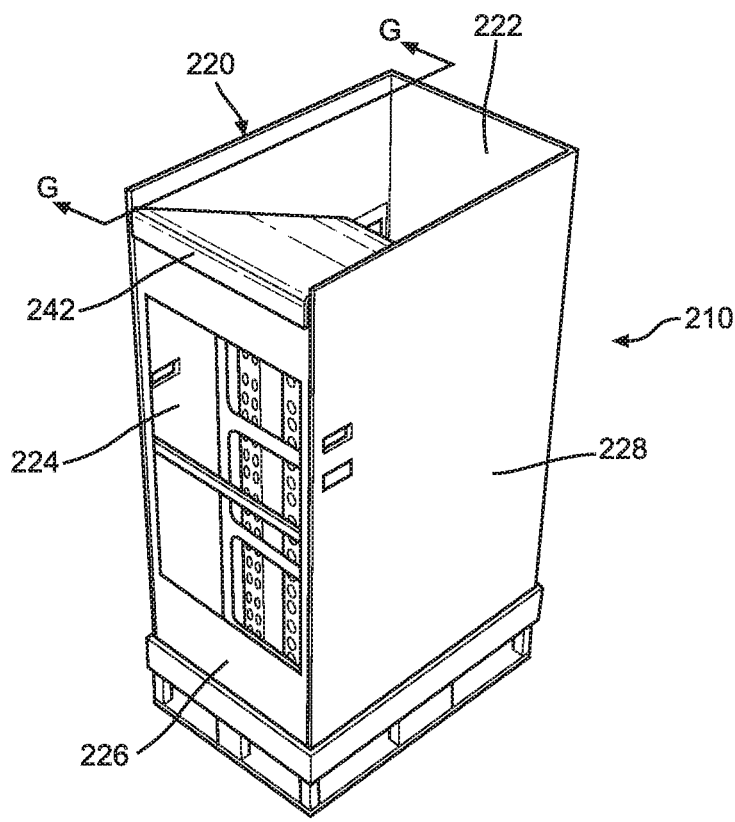
FIG. 20 is a view in perspective illustrating an alternative embodiment of the present invention.
Figure 21:
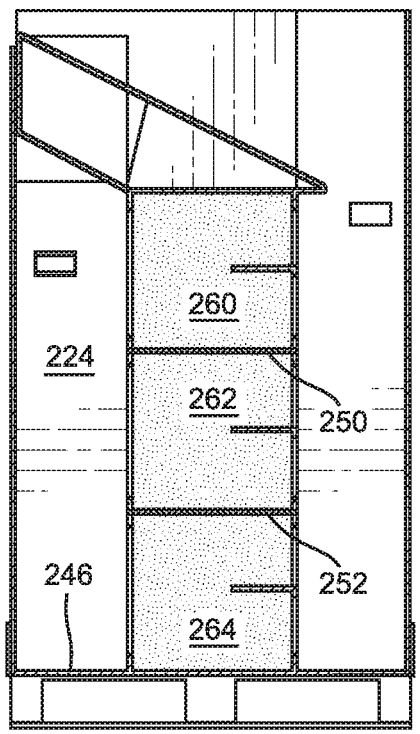
FIG. 21 is a side view in section of the embodiment of FIG. 20 through the line G-G.

In some embodiments of the filtering apparatus, the filter units rest directly upon the floor of the housing. In this configuration, the weight of the top filter unit is supported by the middle and lower filter. When each filter is capable of holding at least 30-50 lbs. of paint or other suspended material, the lowest filter may be crushed or rendered inoperable by the weight of the upper filters, particularly when the lower filter may be the first filter to be filled with paint. One way of addressing this is to support each of the filter units separately so that each filter applies no appreciable weight to the filter(s) beneath. As shown in FIGS. 20-21, an embodiment of the filtering apparatus 210 includes supports 250 and 252 extending between the lateral sidewalls 224 and 228. These supports 250 and 252 extend between the filters 260 and 262 and between the filters 262 and 264. The supports 250 and 252 may be panels or sheets made of metal, corrugated paperboard, wood or any other material or structure that can transfer the weight of the filters away from an underlying filter, such as to the sidewalls or the floor. In some embodiments, the supports may be adhered or otherwise fastened to the sidewalls 224 and 228. In other embodiments, the supports may rest upon beams that extend to the floor 246, thereby transferring the weight to the floor rather than the sidewalls. It is also contemplated that supports may be simply adhesives or fasteners that attach to both the filter units and the sidewalls, and nothing extends between the filter units 260-264.

Figure 14:
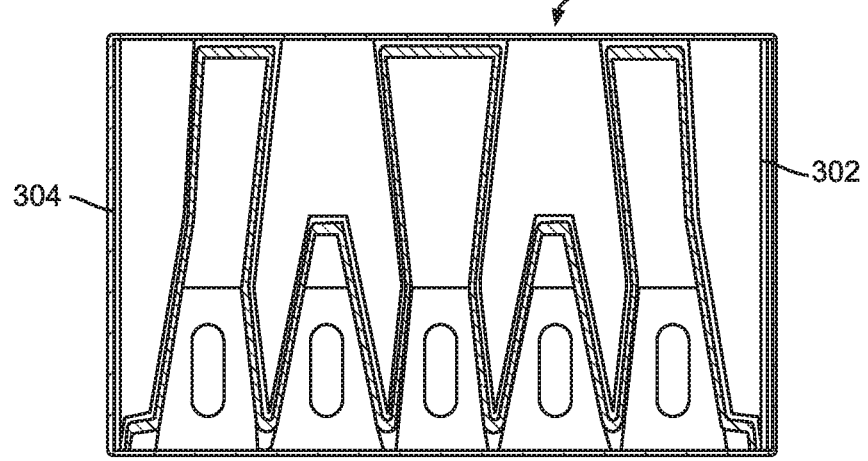
FIG. 14 is a schematic top view in section illustrating a first embodiment of a filter sub-component.

An alternative, or additional, embodiment that avoids the filter units crushing one another is a filter unit with supports built into it to ensure that the weight of the upper filter unit(s) and the collected paint do not crush or distort underlying filter units. Such a filter unit may be used in one of the filtering apparatuses described herein with or without the supports 250 and 252, or others like them. In one embodiment shown in FIGS. 13-14, the panels 302 and 304 are disposed in the ends of the filter unit 300. The panels 302 and 304 are preferably made of the same material as the housing of the filter unit 300, which may be corrugated paperboard, but they may alternatively be made of another suitable material, such as metal, wood or plastic. In such a case, the panels 302 and 304 may be made of corrugated paperboard, preferably with the flutes thereof aligned along the direction that the force is applied, which may be a vertical direction in an operable orientation. The planes of the panels 302 and 304 are preferably parallel to the planes of the end panels of the housing of the filter unit 300. Furthermore, the panels 302 and 304 may have a length and width that is substantially identical to the length and width of the interior of the housing of the filter unit 300, so that the ends and sides of the panels 302 and 304 abut the tops, bottoms and sides of the housing. In this configuration, if a force from an adjacent filter unit begins to deform the filter unit's 300 housing, the deforming force is carried by one or both of the panels 302 and 304 so that further deformation is resisted.

Figure 15:
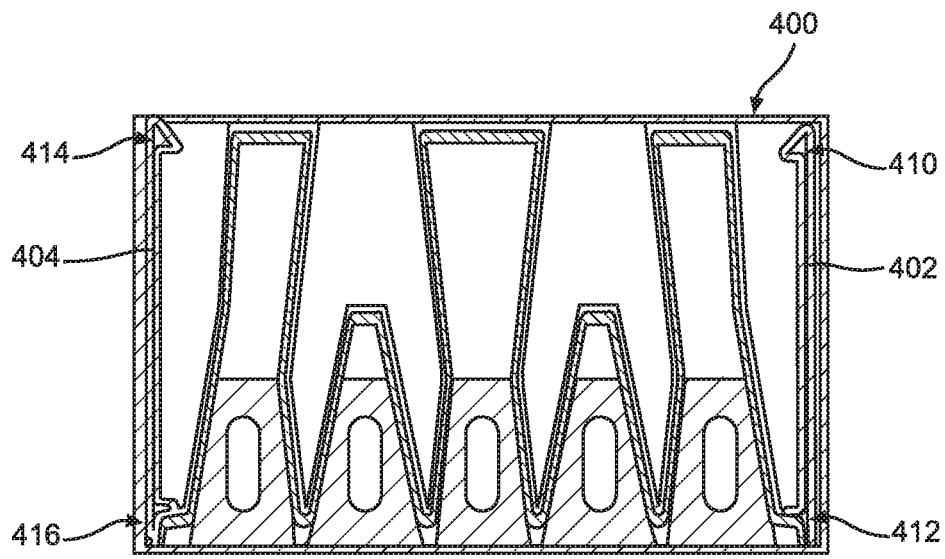
FIG. 15 is a schematic top view in section illustrating a second embodiment of a filter sub-component.
Figure 16:
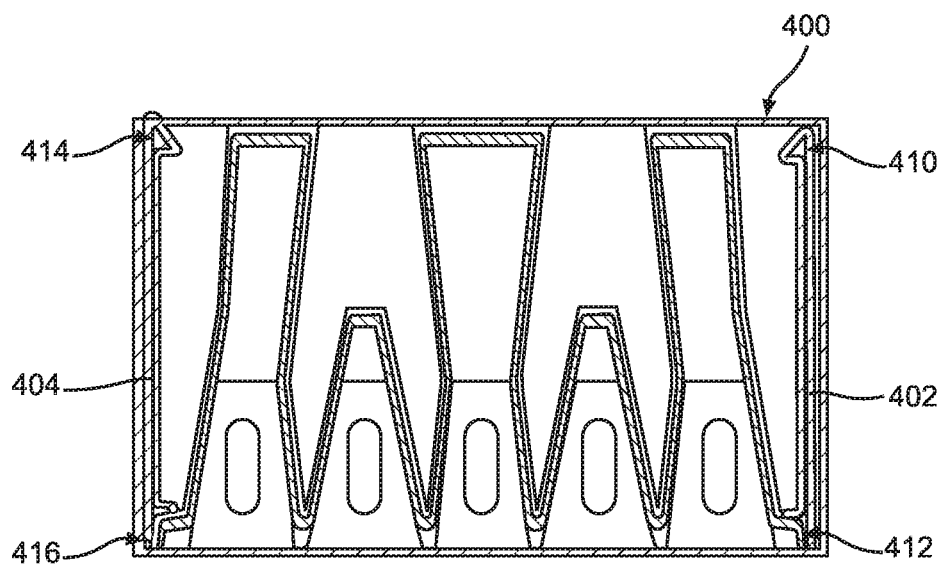
FIG. 16 is a schematic top view in section illustrating a second embodiment of a filter sub-component.

In another embodiment shown in FIGS. 15-16, the panels 402 and 404 are disposed in the ends of the unit 400. The panels 402 and 404 are preferably made of the same material of the housing of the filtration unit 400, which may be corrugated paperboard. In such a case, the panels 402 and 404 may be made of corrugated paperboard, preferably with the flutes thereof aligned along the direction that the force is applied, which may be a vertical direction in an operable orientation. The panels 402 and 404 are preferably parallel to the planes of the end panels of the housing of the filtration unit 400. Furthermore, the panels 402 and 404 have a length and width that is substantially identical to the length and width of the interior of the housing of the filtration unit 400, so that the ends and sides of the panels 402 and 404 abut the tops, bottoms and sides of the housing. In this configuration, if a force from an adjacent filter unit begins to deform the filter unit's 400 housing, the deforming force is applied to one or both of the panels 402 and 404 to resist further deformation.

The panels 402 and 404 have triangular or other shaped reinforcements 410, 412, 414 and 416 at opposing ends of the panels. These reinforcements are formed by folding the panels at the ends from their original, planar shape to form the enlarged shapes that provide additional strength to the panels at the ends and in the corners of the filtration units in the manner of columns. These columns may be triangular, circular, rectangular or irregular. The panels 302, 304, 402 and 404 may be corrugated paper, particularly double-flute, and are placed in the ends of the filtration units' housing between the pleated support for the filtration media and the ends of the housing. The pleated supports provide substantial vertical strength to the filter unit, because on the ends of some filter units there is not as much strength due to a gap between the pleated support and the ends of the housing.

An apparatus 510 is shown in FIGS. 22-26 that is similar to the apparatus 10 shown in FIGS. 3-6, and components that are common to both may not be described again. The sidewalls 522, 524, 526, and 528 are mounted together to define a housing 520. The sidewall 522 has lateral edges 522a and 522b that fold over the sidewalls 524 and 528, respectively, thereby permitting a stronger attachment. Furthermore, the outer edges of the sidewalls 524 and 528 register with the respective inside corners formed by bending the lateral edges 522a and 522b perpendicularly relative to the much larger planar portion that forms the sidewall 522. This has the advantage that a person assembling the apparatus 510 may much more readily discern when the sidewalls 524 and 528 are aligned with the sidewall 522 within tolerances during assembly. A similar configuration exists with the sidewall 526, which has lateral edges 526a and 526b that fasten to the sidewalls 524 and 528, respectively, in a similar manner.

There are two spacers 570 and 580 disposed in the chamber 550 of the apparatus 510 to horizontally support the filter units 560, 562 and 564, reduce or eliminate air movement around the filter units, and support and align the top plate 542 and lower plate 544 in the apparatus 510. The spacer 570 is shown in detail in FIG. 24, and the spacer 580 is substantially the same but oriented in the apparatus 510 in a mirrored orientation to the spacer 570 (as best viewed in FIG. 23). The spacer 570 has a main panel 571 defined by the strips 573, 575, 576, 577, 578, and 579, with two side panels 572 and 574 that extend at right angles to the main panel 571. The strips 573, 575, 576, 577, 578, and 579 extend between and along the side panels 572 and 574 and obstruct air from moving around the outsides of the filter units, such as between the filter units and the sidewalls 524 and 528, the floor 546 and the lower panel 544.

Figure 22:
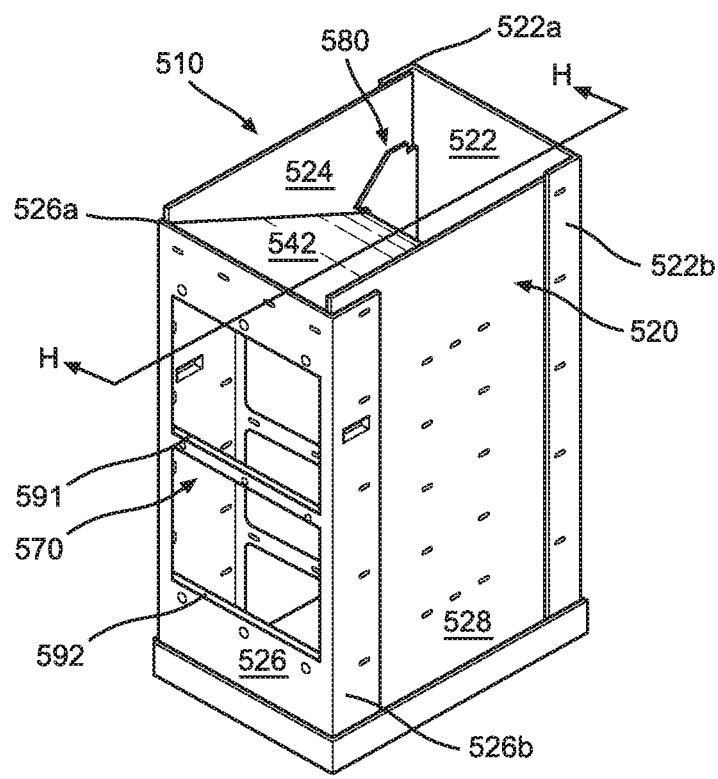
FIG. 22 is a view in perspective illustrating an alternative embodiment of the present invention.
Figure 23:
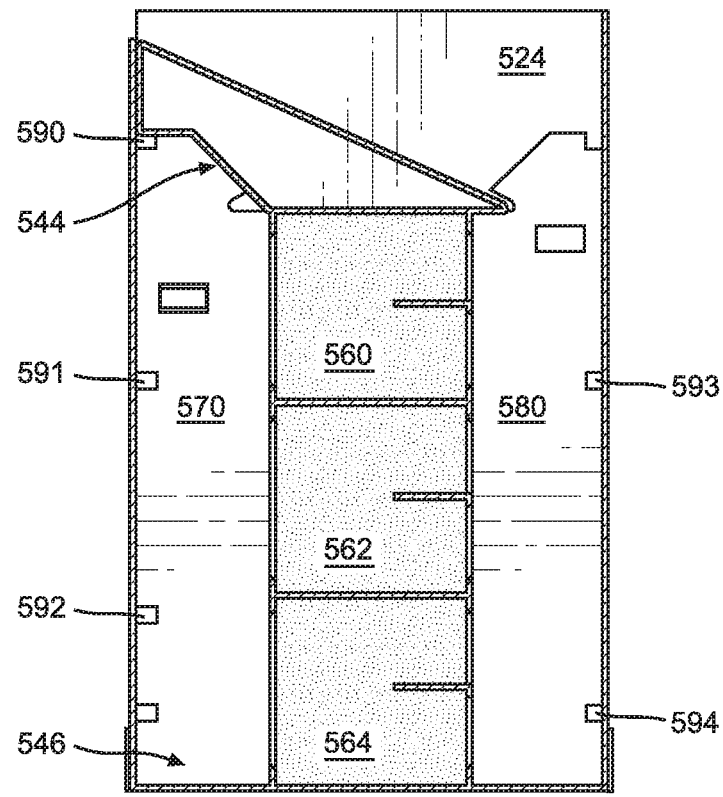
FIG. 23 is a side view in section of the embodiment of FIG. 22 through the line H-H.
Figure 24:
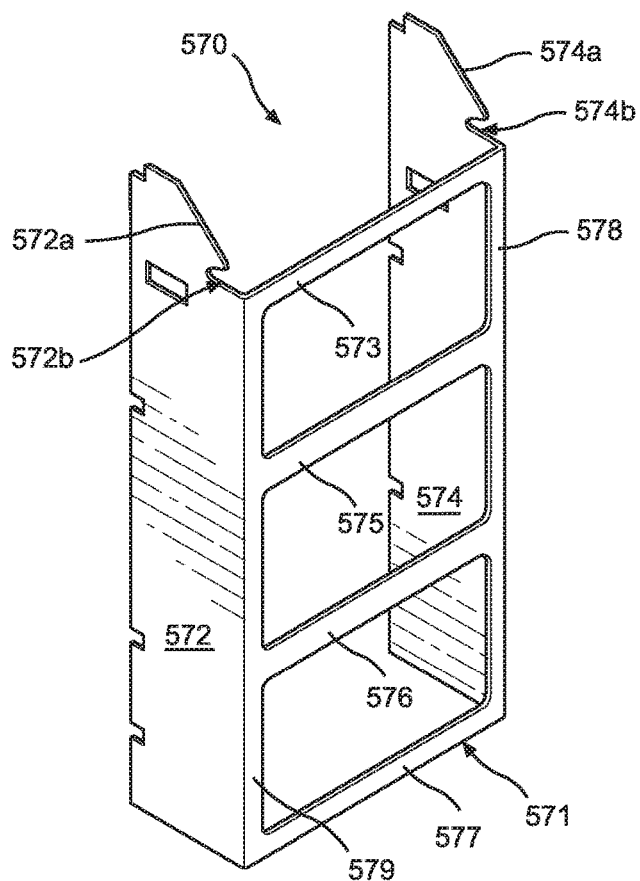
FIG. 24 is a view in perspective illustrating a spacer.
Figures 25, 26:
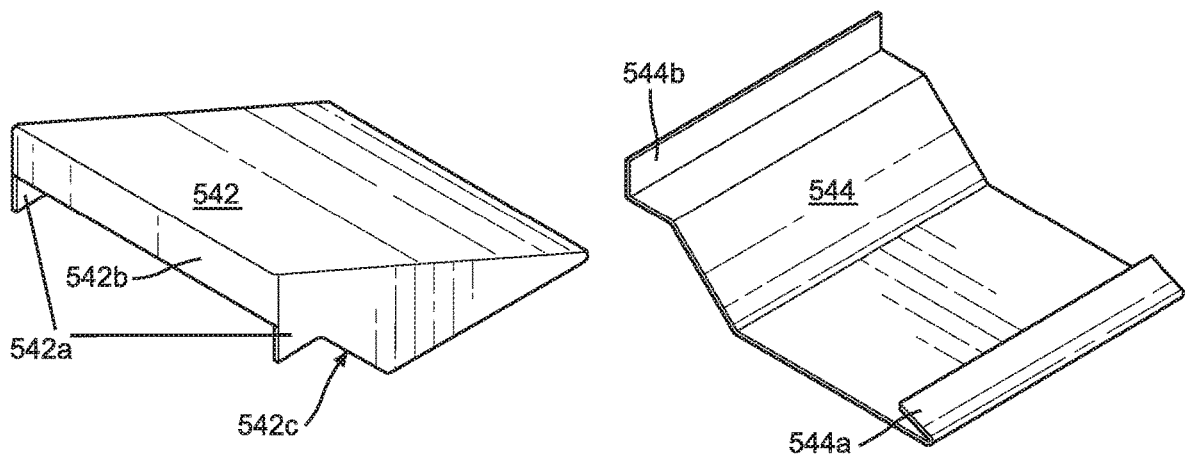
FIG. 25 is a view in perspective illustrating a top plate.
FIG. 26 is a view in perspective illustrating lower plate.

At one end, preferably the top in the orientation of FIGS. 22-23, of the side panels 572 and 574 there are strategically-shaped edges, including the lower plate supporting edges 572a and 574a and the upper plate supporting edges 572b and 574b. As shown in FIG. 23, these edges receive correspondingly shaped portions of the top plate 542 and the lower plate 544, thereby assisting in assembly and support of the apparatus 510. More specifically, the edges 572a and 574a seat against and support the opposing lateral edges of the lower panel 544. The edges 572b and 574b seat against and support the opposing lateral edges of the upstream portion 544a of the lower panel 544, as well as the upstream end of the top panel 542. The folded panels 542a on opposite sides of the top panel 542 and disposed transverse to the overspray-receiving surface (the largest visible surface in FIG. 25) are aligned substantially parallel to, and may be fastened to, the sidewalls 524 and 528. The lower edges 542c (only one is visible in FIG. 25) rest upon the edges 572a and 574a (or upon the lower panel 544 that may be interposed therebetween). The end portions 542b and 544b may attach to the sidewall 526.

When the spacers 570 and 580 are disposed as shown in FIGS. 22-23, their main panels are on opposite sides of the filter units 560-564. This positions the strips 573, 575, 576, 577, 578, and 579 on the spacer 570 and corresponding strips on the spacer 580 over gaps between the filter units and the sidewalls, floor and lower panel. The strips thereby limit or prevent air from bypassing the filter units' filtration media through these gaps. The spacers 570 and 580 also support the filter units 560-564 against being displaced horizontally during use. Thus, as the filter units 560-564 collect paint, the force of air moving through the apparatus 510 may not push the filter units downstream a substantial amount. Instead, the force applied to the filter units by the air is transferred to the sidewalls 22-28, to which the spacers 570 and 580 are preferably attached.

There are laterally-oriented supports between the sidewalls 524 and 528, including the supports 590, 591, 592, 593 and 594, shown in FIGS. 22-23. These may be stapled, adhered and/or otherwise fastened to the sidewalls 22-28. In one embodiment, the supports 590, 591 and 592 are one inch by one inch pieces of wood that are fastened to the sidewalls 524, 526 and 528. The supports 593 and 594 are one inch by one inch pieces of wood that are fastened to the sidewalls 522, 524 and 528. The supports 590, 591, 592, 593 and 594 may prevent deformation of the sidewalls 522-528 that would permit air to bypass the filter units 560-564 and/or the sidewalls, the lower plate 544 or the floor 546.

Figure 27:
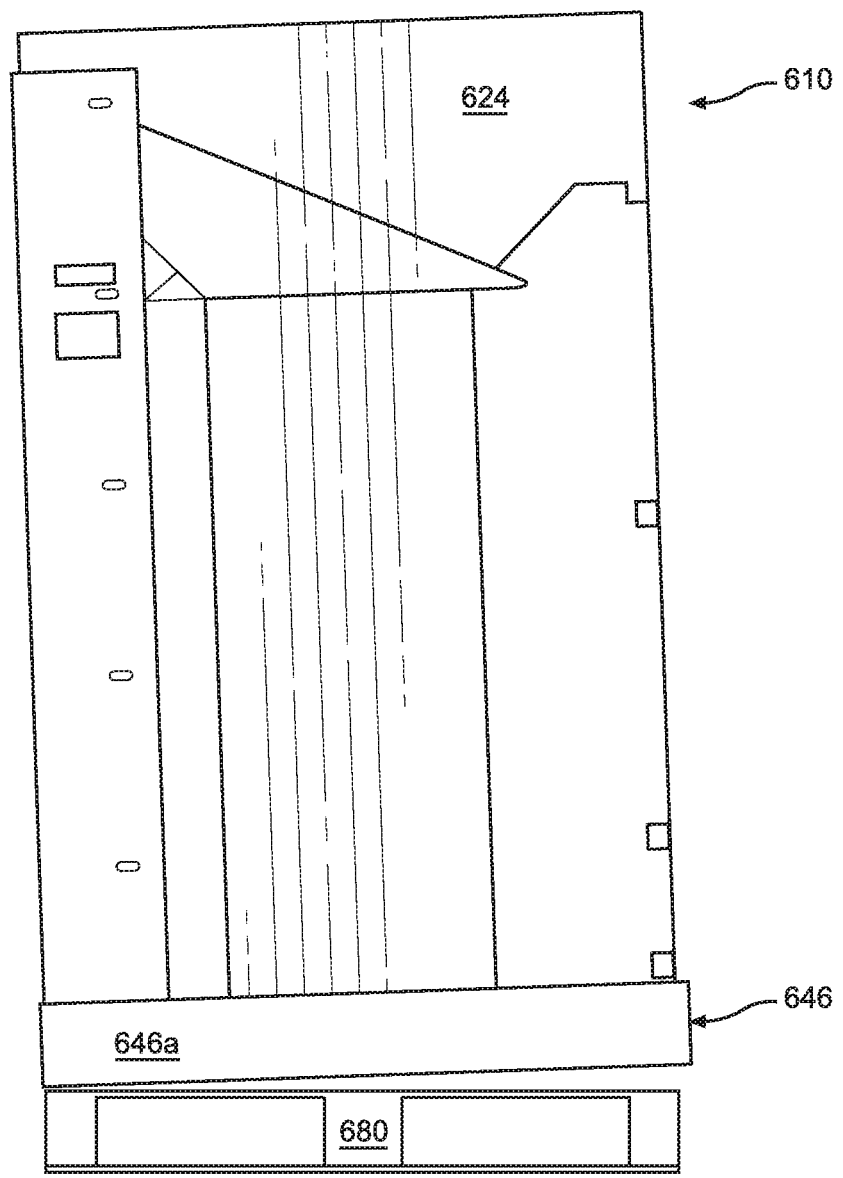
FIG. 27 is a side schematic view illustrating an alternative embodiment of the present invention.
Figure 28:
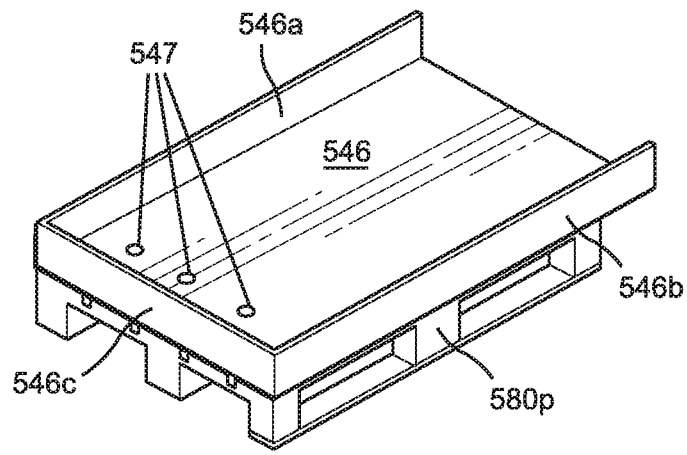
FIG. 28 is a view in perspective illustrating components in an embodiment of the invention during assembly of the components.
Figure 29:
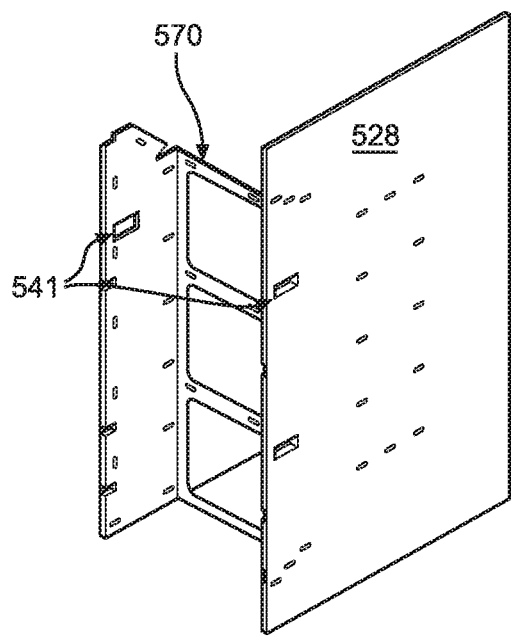
FIG. 29 is a view in perspective illustrating components in an embodiment of the invention during assembly of the components.
Figure 30:
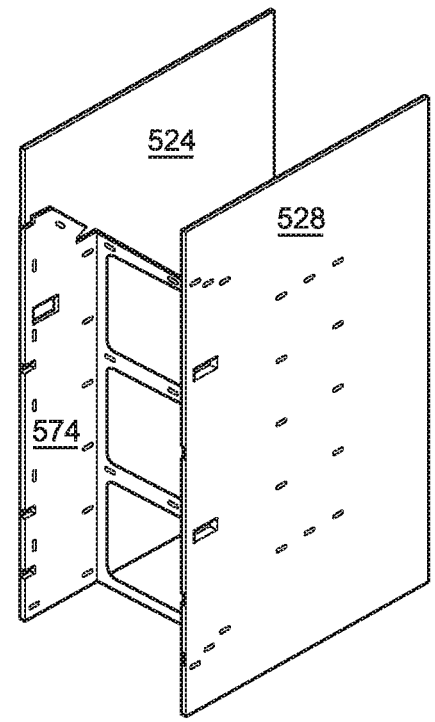
FIG. 30 is a view in perspective illustrating components in an embodiment of the invention during assembly of the components.
Figure 31:
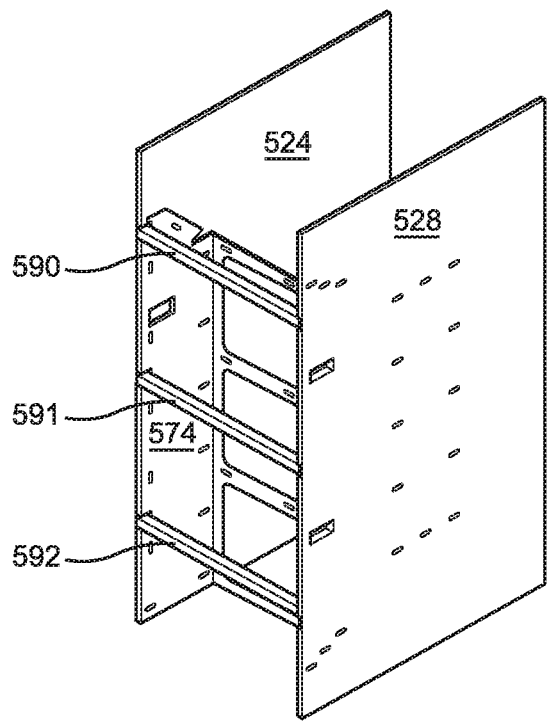
FIG. 31 is a view in perspective illustrating components in an embodiment of the invention during assembly of the components.
Figure 32:
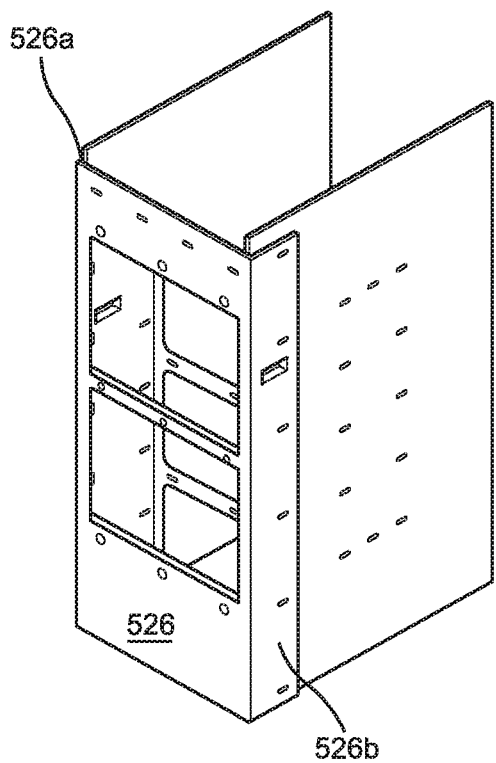
FIG. 32 is a view in perspective illustrating components in an embodiment of the invention during assembly of the components.

In some embodiments, the apparatus may be transported in a collapsed state and is assembled by an intermediary party, such as a distributor, or the end user. Assembly of the apparatus 510 of FIG. 22 occurs as follows with attention to FIGS. 28-42. The pallet 580p is attached to the floor 546, such as by stapling through the marks 547 on the floor as shown in FIG. 28. This is described in some detail in relation to FIG. 27 below. Three of the side panels 546a, 546b and 546c are formed by folding them upwardly perpendicular to the floor panel and fastening the side panels at their overlapping portions. The downstream spacer 570 and the sidewalls 524 and 528 are attached together as shown in FIGS. 29 and 30, such as by stapling through the sidewalls 524 and 528 and the corresponding side panels 572 and 574.

Figure 33:
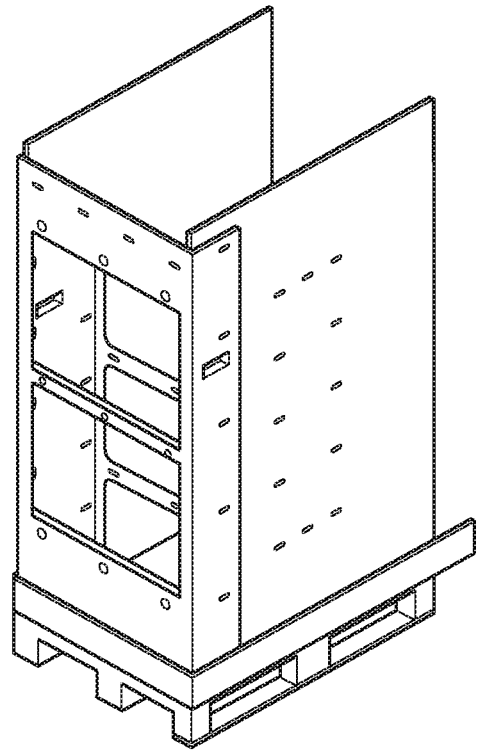
FIG. 33 is a view in perspective illustrating components in an embodiment of the invention during assembly of the components.
Figure 34:
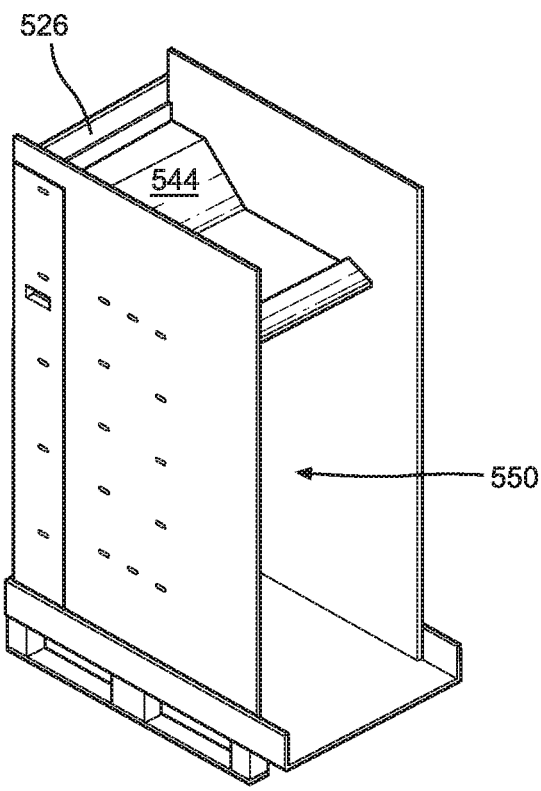
FIG. 34 is a view in perspective illustrating components in an embodiment of the invention during assembly of the components.

The supports 590, 591 and 592 are mounted between the sidewalls 524 and 528 (FIG. 31), and the downstream sidewall 526 is attached to the sidewalls 524 and 528 (FIG. 32), such as by stapling through the lateral edges 526a and 526b, the sidewalls 524 and 528 and also possibly the side panels 572 and 574. The combination of the pallet 580p and the floor 546 may receive the combination of the sidewalls 524, 526 and 528 with the spacer 570 and other components (FIG. 33). The two combinations may be attached by adhesive or by extending fasteners through the components, or the contact between the sidewalls 524, 526 and 528 and the side panels 546a, 546b and 546c may have sufficient friction to hold the two together during use.

Figure 35:
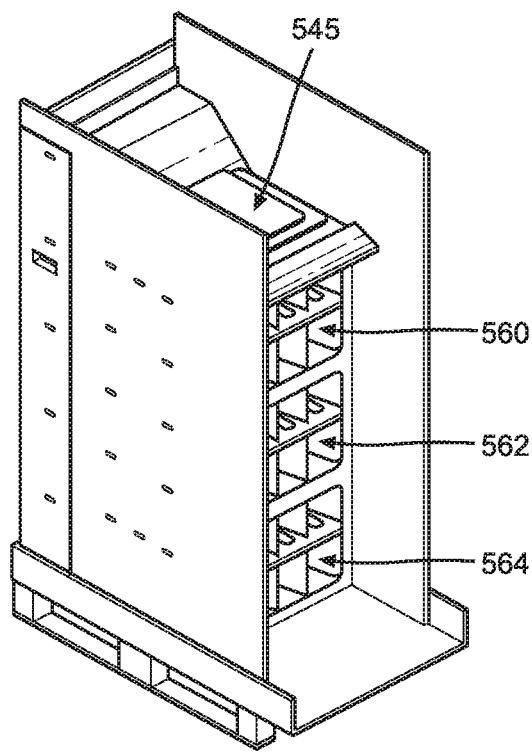
FIG. 35 is a view in perspective illustrating components in an embodiment of the invention during assembly of the components.
Figure 36:
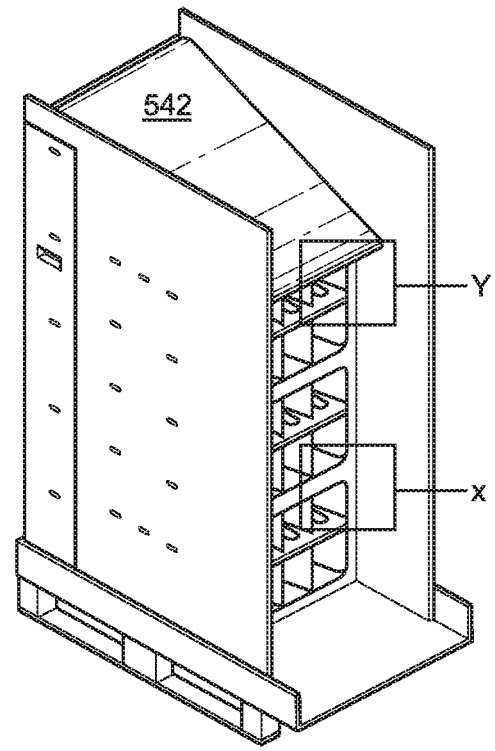
FIG. 36 is a view in perspective illustrating components in an embodiment of the invention during assembly of the components.
Figure 37:
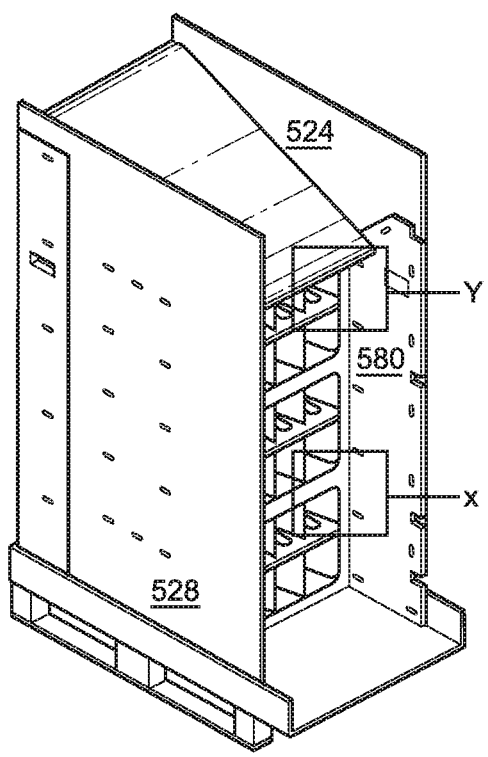
FIG. 37 is a view in perspective illustrating components in an embodiment of the invention during assembly of the components.
Figure 38:
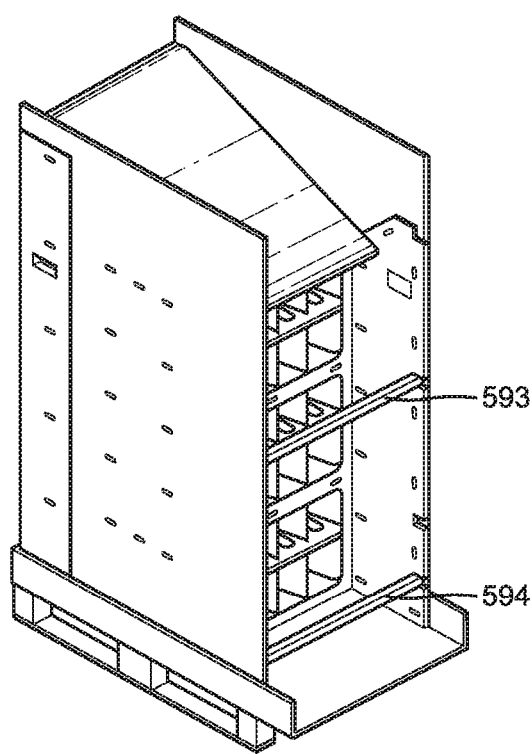
FIG. 38 is a view in perspective illustrating components in an embodiment of the invention during assembly of the components.
Figure 39:
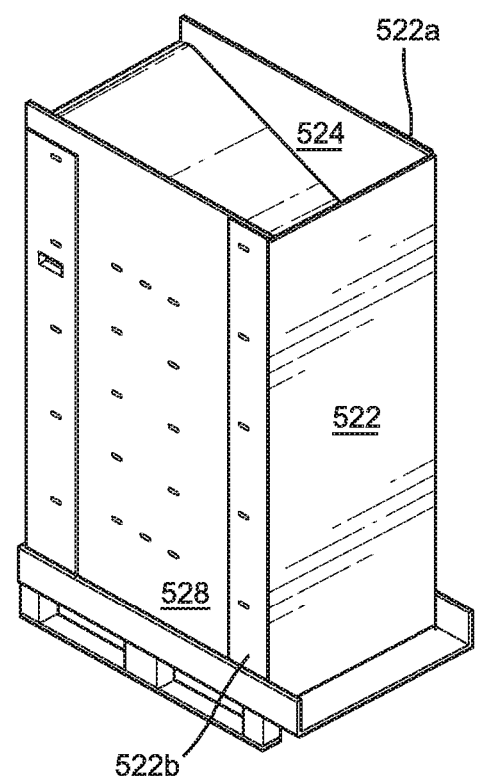
FIG. 39 is a view in perspective illustrating components in an embodiment of the invention during assembly of the components.

The lower panel 544 is fixed to the sidewall 526 while resting upon the upper edges of the spacer 570 (FIG. 34) to assist in correctly positioning the lower panel 544 relative to the other components. The filter units 560, 562 and 564 are placed upstream of the spacer 570 within the lower chamber 550 (FIG. 35). Any scrap 545 may be placed on top of the lower panel 544 where it will be enclosed by the top panel 542, which is attached to the sidewalls 524, 526 and 528 (FIG. 36), in the upper chamber formed between the lower panel 544 and the top panel 542. The upstream spacer 580 is placed in the lower chamber 550 (FIG. 37) and is attached to the sidewalls 524 and 528. The supports 593 and 594 are mounted between the sidewalls 524 and 528 (FIG. 38) in slots formed in the upstream spacer 580. The upstream sidewall 522 is mounted to the sidewalls 524 and 528 and the side panels 582 and 584 of the upstream spacer 580 (FIG. 39) by the lateral edges 522a and 522b bending over the sidewalls 524 and 528 and being stapled, for example.

Figure 40:
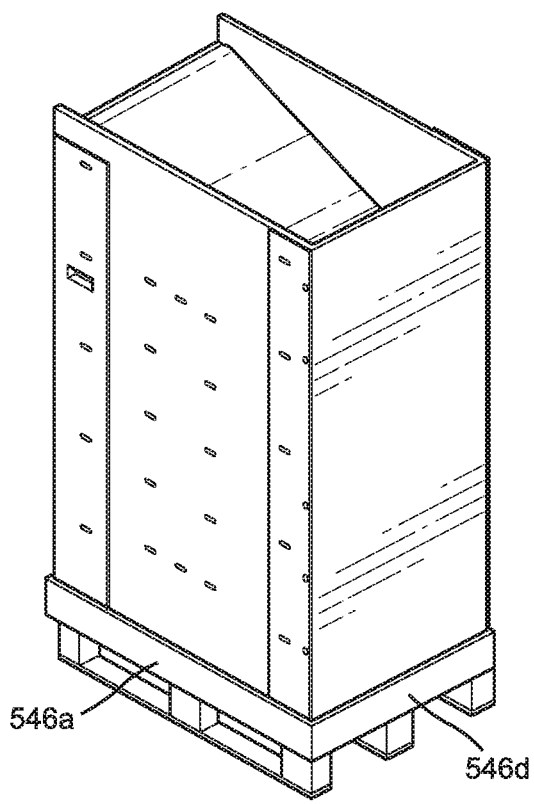
FIG. 40 is a view in perspective illustrating components in an embodiment of the invention during assembly of the components.
Figure 41:
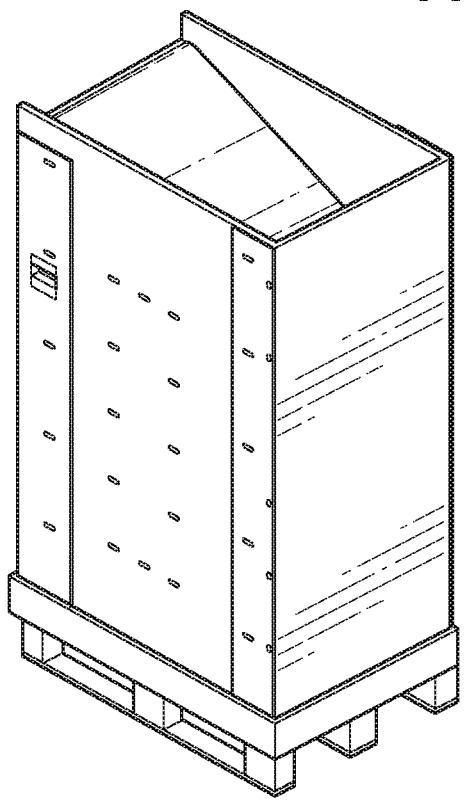
FIG. 41 is a view in perspective illustrating components in an embodiment of the invention during assembly of the components.
Figure 42:
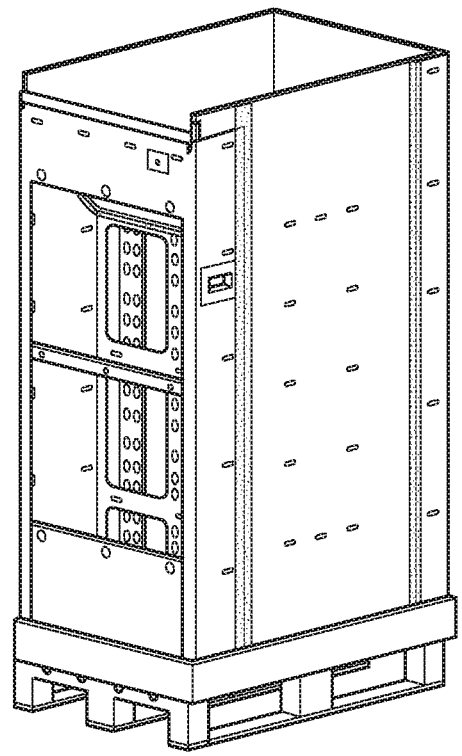
FIG. 42 is a view in perspective illustrating components in an embodiment of the invention during assembly of the components.

The side panel 546d is folded and fastened to the adjacent side panels 546a and 546c to complete the floor 546 (FIG. 40). Handles 540 (only one is visible in FIG. 41) are inserted into the openings 541 (FIG. 29) and the seams are optionally taped (FIG. 42) to further prevent air leakage through seams.

An optional feature of the invention is the pivoting attachment of a floor structure to the pallet near the downstream end of the apparatus. The apparatus 610 in FIG. 27 has a floor 646 attached to the pallet 680, such as by staples, nails or any other fasteners extending through the floor 646. Alternatively, adhesive may be used. The fasteners preferably extend through the floor 646 at, or a short distance upstream from, the downstream end of the floor 646. The short distance may be one inch, 3-10 inches, within about ten to twenty percent of the width of the apparatus 610, or any other distance that permits the function described herein. An example of the location of the fasteners or adhesive is the markings 547 in FIG. 28.

The floor 646 is a tray that has a planar, horizontal (in the orientation shown in FIG. 27) floor panel, and transverse side panels that are much smaller than the floor panel. One example of the side panels is the panel 646a, which is the only side panel visible in FIG. 27. In the embodiment of FIG. 27, there are three other side panels extending upwardly from the horizontal floor panel positioned beneath the sidewalls and filter units that are in a similar position to the sidewalls and filter units in embodiments described herein. The side panels extend tightly up the sidewalls (e.g., 624) of the apparatus 610 to form a seal with the sidewalls. The side panels may not be attached to the sidewalls so that if the sidewalls are forced upwardly, the sidewalls may slide relative to the side panels but still maintain the seal. Therefore, if the apparatus 610 is misaligned slightly with the filtration system structure it is inserted into, it may be pivoted downstream, as shown in FIG. 27, thereby either forming a space between the floor 646 and the pallet 680 or between the sidewalls and the floor panel. This may occur when the mechanisms of the filtration system into which the apparatus 610 is inserted moves the downstream end of the apparatus 610 into the appropriate position for use. In such a situation, the pallet and floor structure (including side panels) remain stationary and the remainder of the apparatus 610 pivots upwardly about the fasteners at the markings 547 in FIG. 28.

Figure 43:
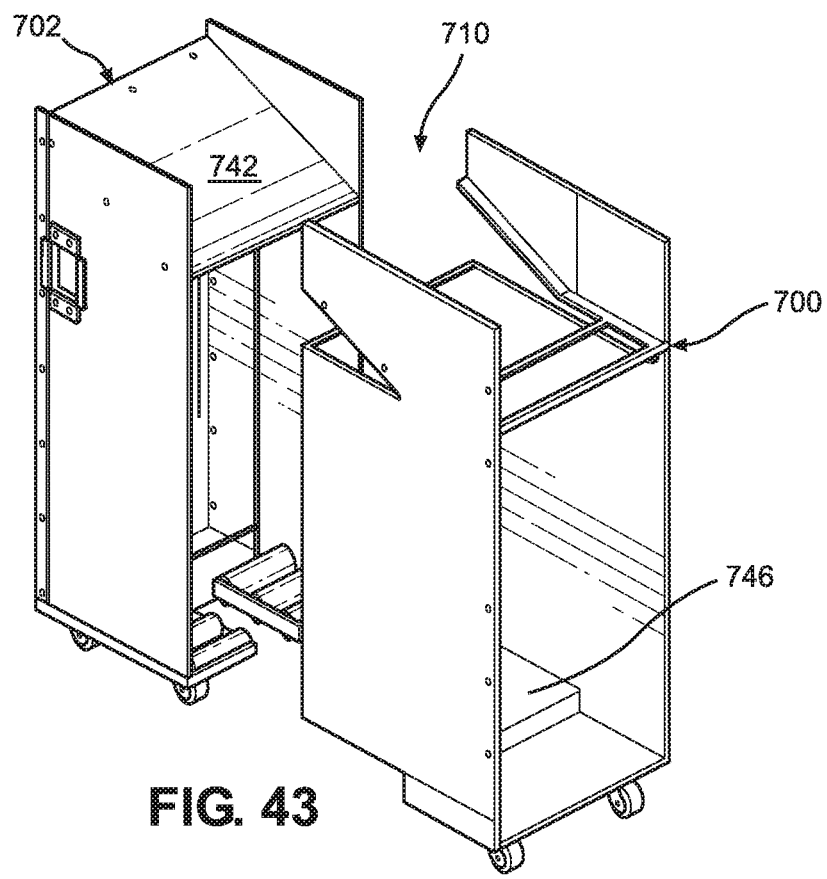
FIG. 43 is a view in perspective illustrating an embodiment of the present invention in a disassembled state.
Figure 44:
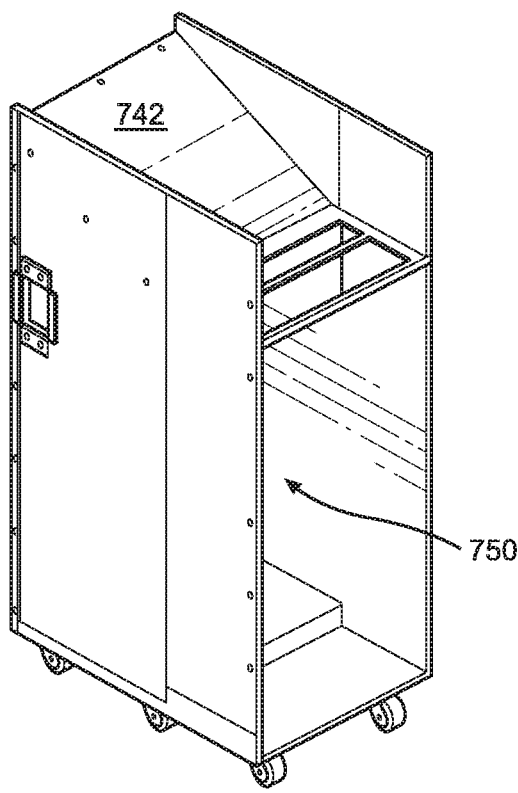
FIG. 44 is a view in perspective illustrating the embodiment of FIG. 43 in an assembled state.
Figure 45:
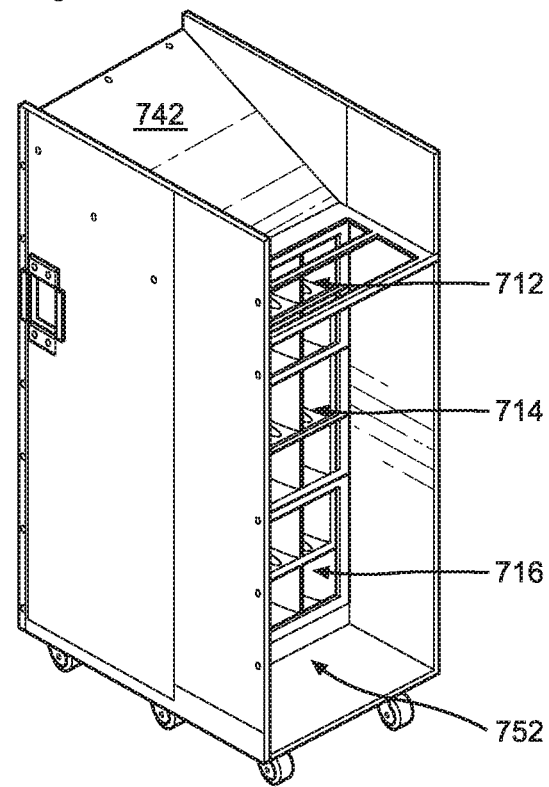
FIG. 45 is a view in perspective illustrating the embodiment of FIG. 43 in an assembled state with filter units mounted therein.

An alternative filtering apparatus 710 is shown in FIGS. 43-53 in various stages of assembly. FIG. 43 shows two components of the apparatus 710, both preferably made primarily of metal, plastic or some other suitable and reusable material. The upstream housing 700 and the downstream housing 702 are removably mounted to one another by inserting a portion of the upstream housing 700 into the downstream housing 702 as shown in FIG. 44. Separation as in FIG. 43 permits cleaning and removal of components that are worn or have reached the end of their useful life. The filter units 712, 714 and 716 may be mounted in the upstream housing 700 (FIG. 45) before or after attachment of the housings 700 and 702 together. The filter units 712, 714 and 716 rest upon the floor 746 of the upstream housing 700 as shown.

Figure 46:
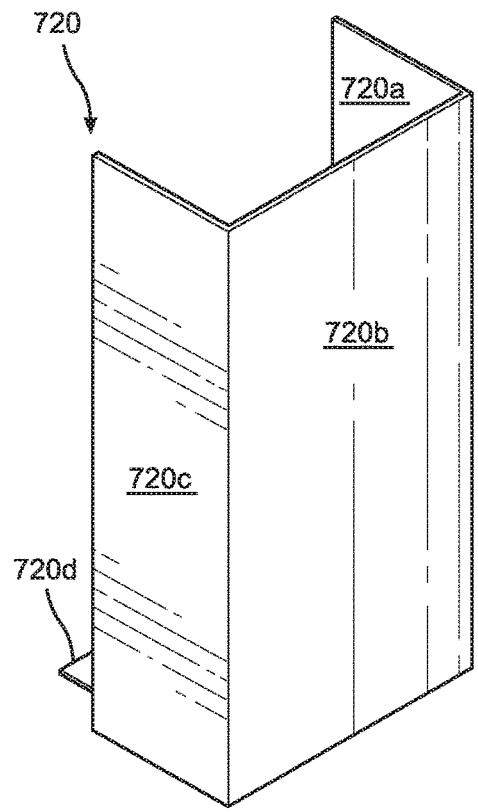
FIG. 46 is a view in perspective illustrating a first liner for the embodiment of FIG. 43.
Figure 47:
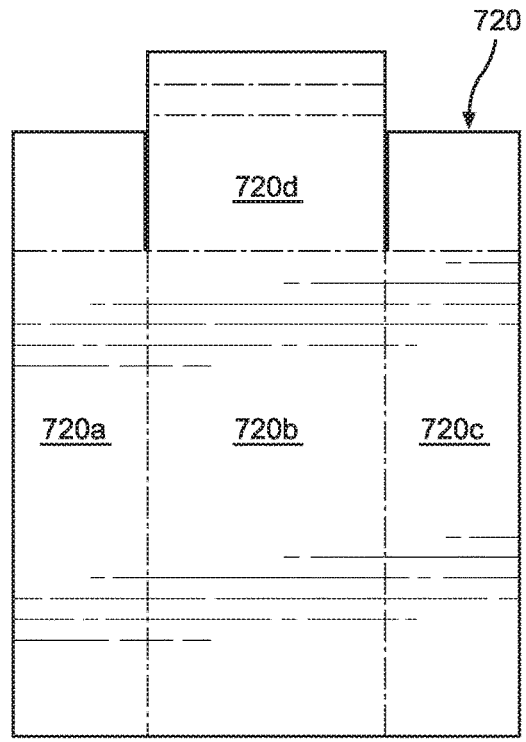
FIG. 47 is a top view illustrating the liner of FIG. 46 in a planar, unfolded state.

An entry chamber liner 720 is shown in FIGS. 46-47 having three sidewalls 720a, 720b and 720c and a floor 720d. The liner 720 is preferably mounted (FIG. 50) in the upstream housing 700 to receive the paint or other material that enters the entry chamber 752, which is a portion of the lower chamber 750 upstream of the filter units 712-716. The lower chamber 750 is the interior of the combined housings 700 and 702. The liner 720 may be mounted by temporary adhesives or by removable or single-use fasteners. Thus, when the housings 700 and 702 are separated for cleaning and replacement of the filter units 712-716, the liner 720 may be removed and replaced with an unused liner that is identical to the liner 720.

Figure 48:
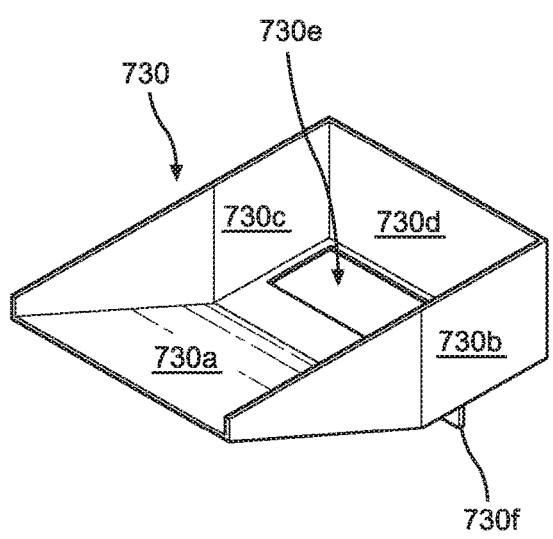
FIG. 48 is a view in perspective illustrating a second liner for the embodiment of FIG. 43.
Figure 49:
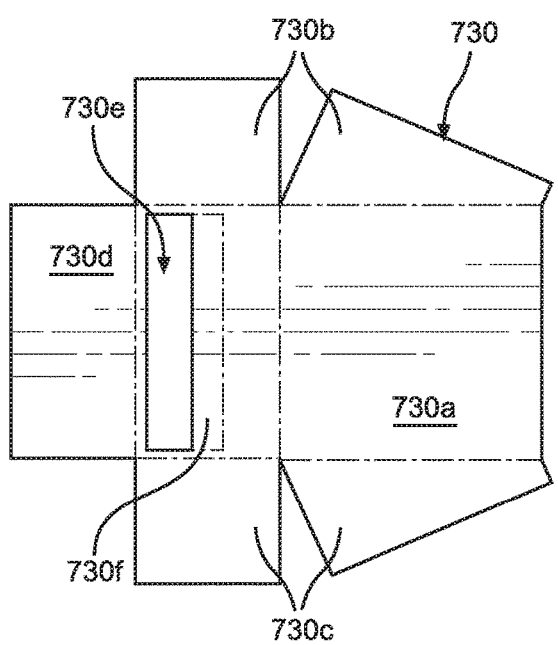
FIG. 49 is a top view illustrating the liner of FIG. 48 in a planar, unfolded state.

A deflector liner 730 is shown in FIGS. 48-49 having an angled plate 730a, three sidewalls 730b, 730c and 730d and an opening 730e, which is aligned with the entry opening to the entry chamber 752. The liner 730 is preferably mounted in the top of the apparatus 710, and when the housings are assembled the angled plate covers the top plate 742 of the downstream housing 702. The liner 730 may be mounted by temporary adhesives or by removable or breakable fasteners. Thus, when the housings are separated for cleaning and replacement of the filter units, the liner 730 is removed and replaced with an unused liner that is identical to the liner 730. The overhang 730H (FIG. 53) is a portion of the deflector liner 730 that effectively extends the top plate upstream of the front face of the top filter unit 712 by an amount sufficient to prevent strands of drying paint that flows downwardly into the lower chamber 50 from entering the filter units. The entry opening baffle 730f is a panel of the liner 730 that extends downwardly from the liner 730 at the most downstream edge of the entry opening 740, which is upstream of the most upstream face of the filter unit 712 by a few inches and possibly twelve inches. The baffle 730f inhibits paint that flows down the angled plate 730a of the liner 730 from being pulled into the filter units, beyond the effect the overhang 730H has.

Figure 50:
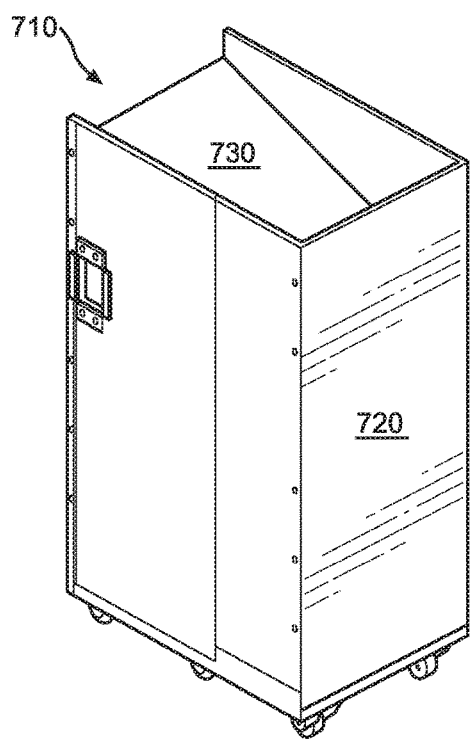
FIG. 50 is a view in perspective illustrating the embodiment of FIG. 43 with the first and second liners in place.
Figure 51:
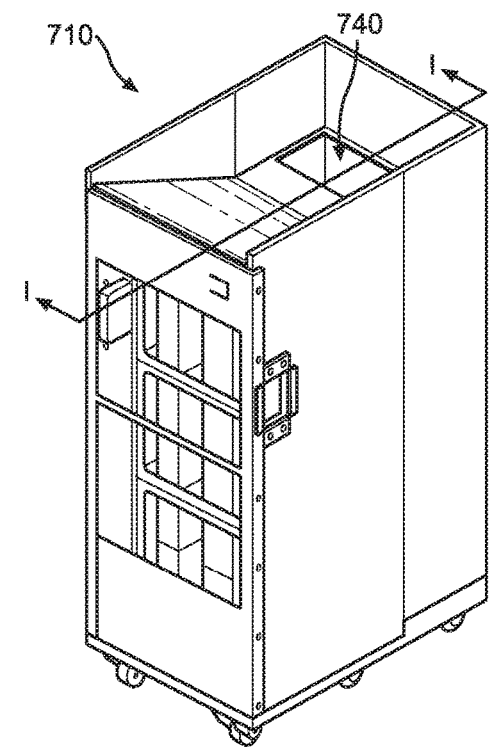
FIG. 51 is a view in perspective illustrating the embodiment of FIG. 43 from a different perspective.
Figure 52:
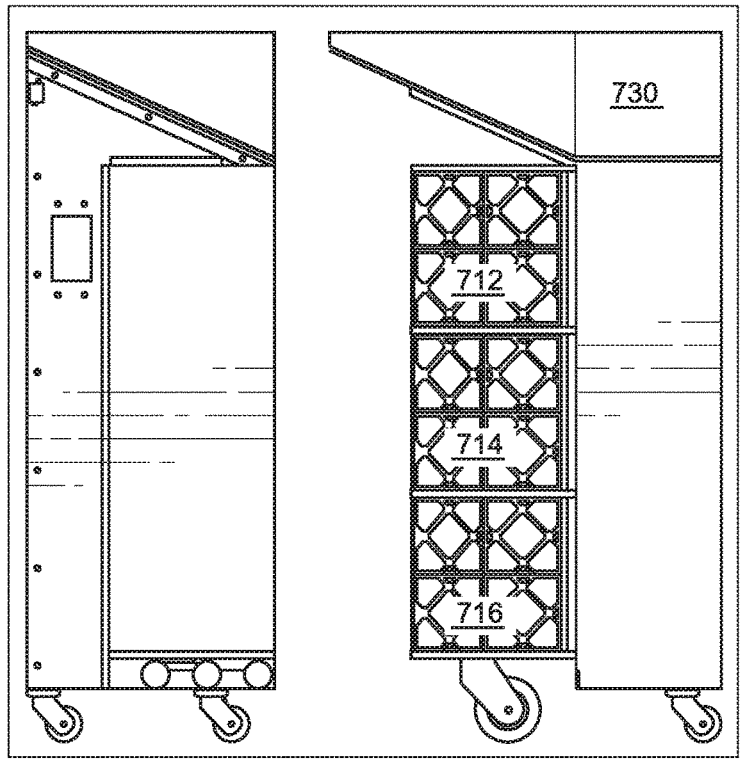
FIG. 52 is a side view illustrating the embodiment of FIG. 43 in a disassembled state.
Figure 53:
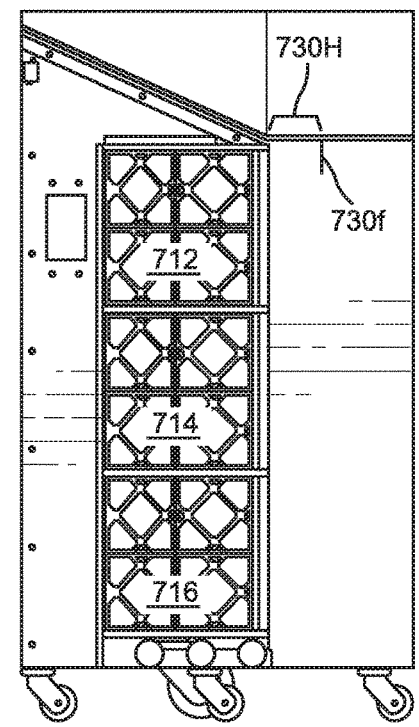
FIG. 53 is a side view in section of the embodiment of FIG. 43 through the line I-I of FIG. 51.

The assembled apparatus 710 is shown in FIGS. 50-51, and in section in FIGS. 52-53 with the liners 720 and 730 in an operable position. The assembled apparatus 710 is used in the same manner as has been described herein for other filter apparatuses, with the result that paint coats the deflector liner 730 as it enters the apparatus 710, and the entry chamber liner 720 as the air enters the entry chamber 752. As the air turns from a generally vertical to a generally horizontal direction flowing from upstream to downstream, the air flows through the filter units 712-716 wherein essentially all of the remaining overspray paint is removed. After the filter apparatus 710 removes paint from overspray air for a period of time during which the apparatus 710 has its disposable surfaces coated with paint, the apparatus 710 is removed from service. At this time, the two housings 700 and 702 are separated, the liners 720 and 730 and the filter units 712-716 are removed and unused replacements are mounted in place. Any other paint is removed and the apparatus 710 is prepared to be placed back into service. This process may be repeated indefinitely, or until the apparatus 710 is discarded or recycled after many uses.

Figure 54:
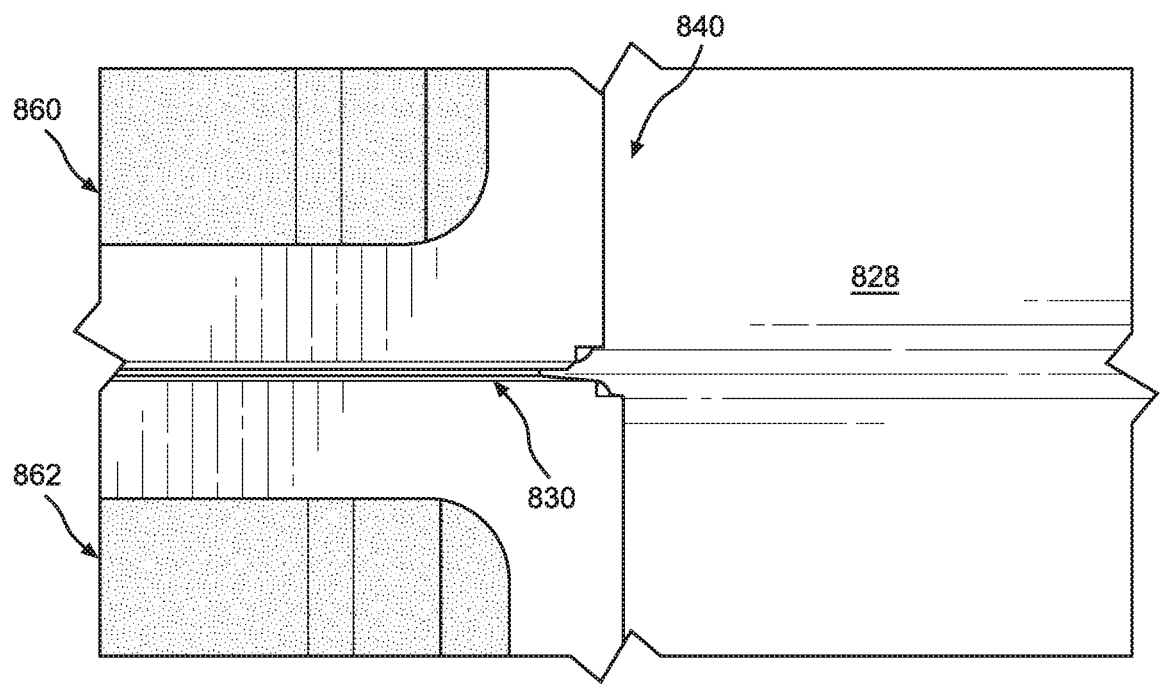
FIG. 54 is a magnified view illustrating the encircled portion X of FIG. 36.
Figure 55:
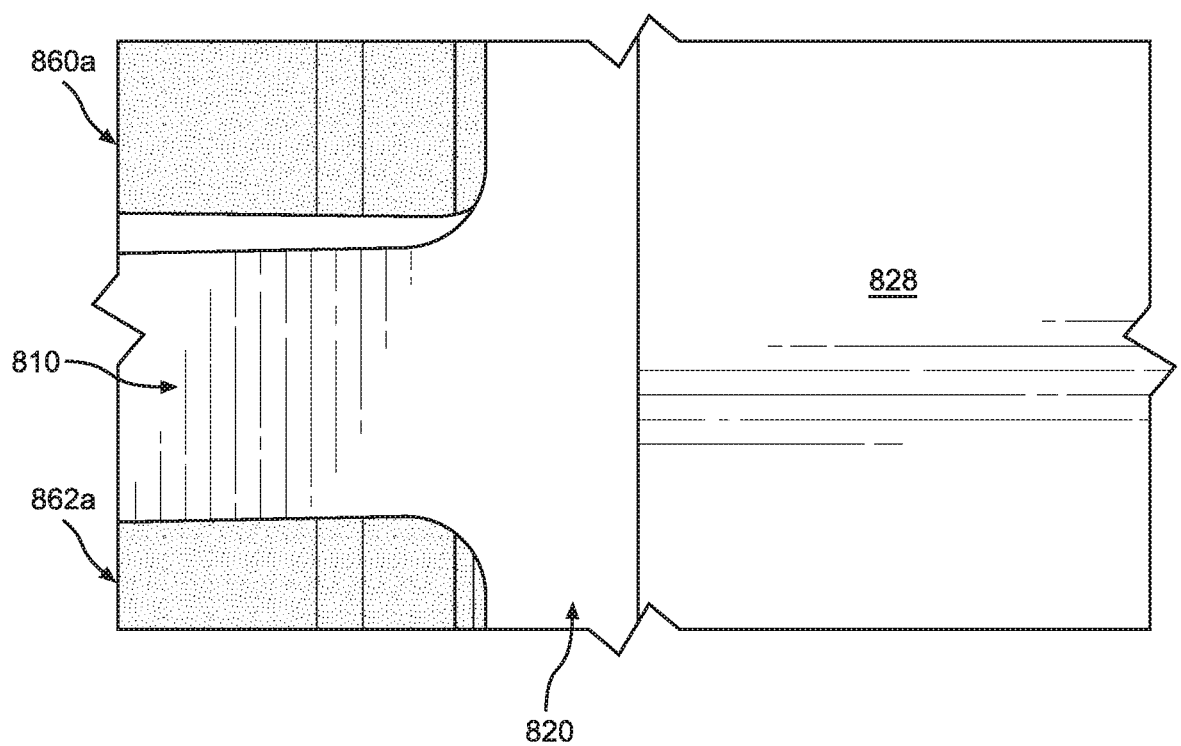
FIG. 55 is a magnified view illustrating the encircled portion X of FIG. 37.

An example of a structure for reducing or eliminating air bypass of filter units is shown in FIGS. 54-55 in a close-up view of a junction between two filter units 860 and 862 and a sidewall 828. The junction is shown in FIG. 55 with the strip 810 placed over the gap 830, where the strip 810 physically covers the gap 830 so air is guided to pass through the filtration media 860a and 862a rather than the gap 830. The strip 820 covers the gap 840 between the sidewall 828 and the filter units 860 and 862, and thus the air is directed into the filtration media rather than through the gap 840.

Figure 56:
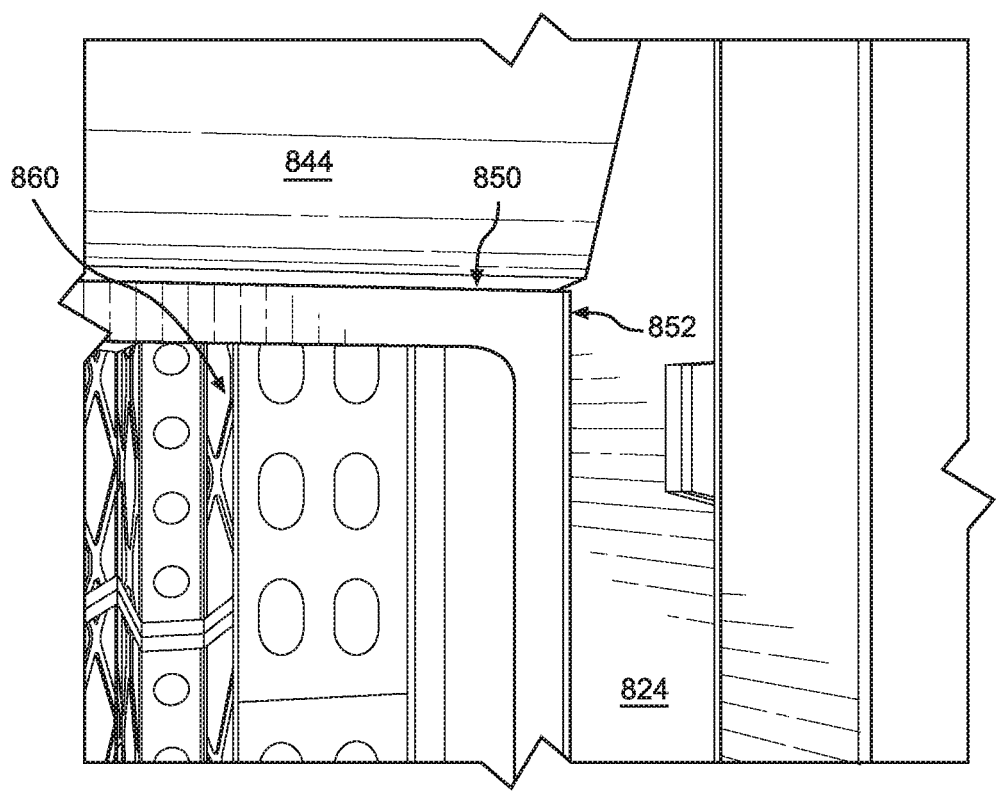
FIG. 56 is a magnified view illustrating the encircled portion Y of FIG. 36.
Figure 57:
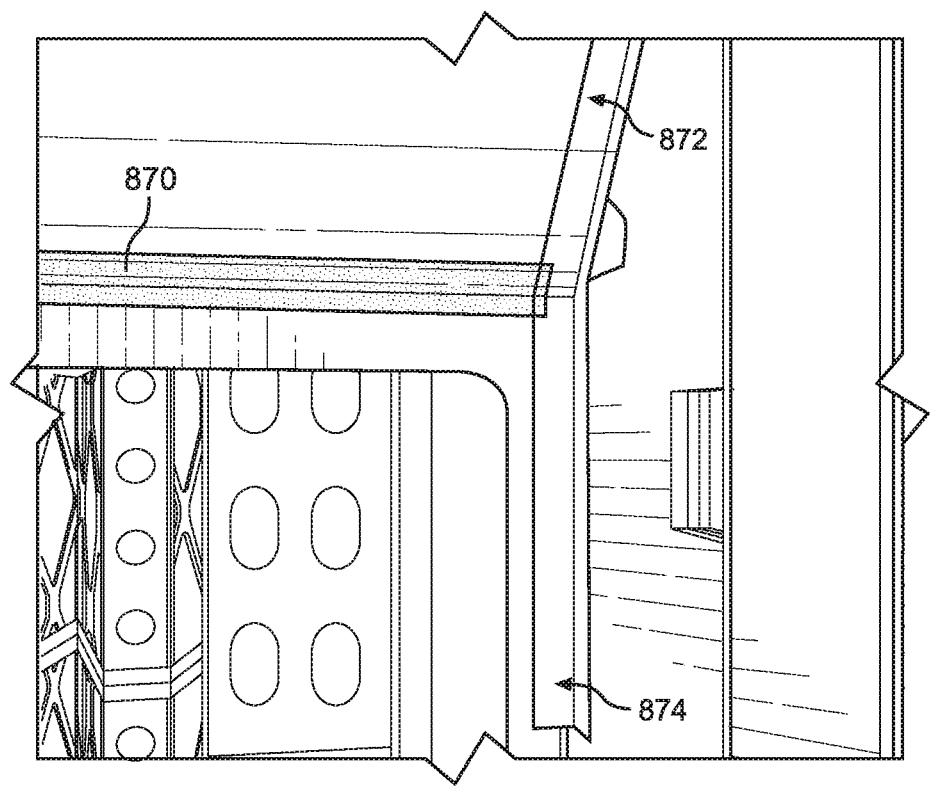
FIG. 57 is a magnified view illustrating the encircled portion Y of FIG. 37.

In FIG. 56, a close-up view is shown of a junction between the lower panel 844 and the filter unit 860, along with the filter unit 860 and the sidewall 824. The gaps 850 and 852, respectively, are formed therebetween. In FIG. 57 a close-up view of the same region is shown with tape strips 870, 872 and 874 are placed over the gaps to prevent air bypass of the filter unit 860. The tape may be a supplement, or an alternative, to the strips 810 and 820.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A filtering apparatus comprising:
    (a) an elongated housing configured to receive overspray air along an entry flow path, which is substantially parallel to the length of the housing, and guide the overspray air along an exit flow path that is transverse to the entry flow path, the housing defined by at least an upstream sidewall, lateral sidewalls and a downstream sidewall, the downstream sidewall having an opening through which the overspray air exits the housing;
    (b) a top plate mounted to the housing and having an overspray-receiving surface toward which overspray air in the entry flow path is directed, wherein an entry opening is defined by the upstream sidewall, the lateral sidewalls and an edge of the top plate that is closest to the upstream sidewall, and wherein the top plate is disposed at an angle to the entry flow path for receiving the entry air flow and guiding it through the entry opening;
    (c) at least one filter unit removably-mounted in the housing along the exit flow path on an opposite side of the top plate from the paint-receiving surface, the filter unit configured to receive the overspray air along the exit flow path and having an upstream face; and
    (d) an overhanging portion formed where the top plate overhangs the filter unit, the overhanging portion extending upstream by at least about one inch from the upstream face of the filter unit, thereby mitigating flow of material from the overspray-receiving surface to the filter unit.

2. The filtering apparatus in accordance with claim 1, wherein at least one of the sidewalls has a lateral edge folded over at least one adjacent sidewall, thereby registering an edge of said at least one adjacent sidewall with a respective inside corner formed by the folded lateral edge.

3. A filtering apparatus comprising:
    (a) an elongated housing configured to receive overspray air along an entry flow path, which is substantially parallel to the length of the housing, and guide the overspray air along an exit flow path that is transverse to the entry flow path, the housing defined by at least an upstream sidewall, lateral sidewalls and a downstream sidewall, the downstream sidewall having an opening through which the overspray air exits the housing;
    (b) a top plate mounted to the housing and having an overspray-receiving surface toward which overspray air in the entry flow path is directed, wherein an entry opening is defined by the upstream sidewall, the lateral sidewalls and an edge of the top plate that is closest to the upstream sidewall, and wherein the top plate is disposed at an angle to the entry flow path for receiving the entry air flow and guiding it through the entry opening; and
    (c) at least one filter unit disposed in the housing along the exit flow path on an opposite side of the top plate from the paint-receiving surface, the filter unit having an upstream face, wherein at least a portion of the upstream face that is closest to the edge of the top plate is disposed downstream of the edge of the top plate to form an overhanging portion where the top plate overhangs the filter unit, the overhanging portion extending upstream by at least about one inch from the upstream face of the filter unit, thereby mitigating flow of material from the overspray-receiving surface to the filter unit.

4. The filtering apparatus in accordance with claim 3, further comprising a first overspray-receiving shield removably mounted to at least a portion of the overspray-receiving surface of the top plate and a second overspray-receiving shield removably mounted to at least a portion of a surface of the upstream sidewall that faces the top plate.

5. The filtering apparatus in accordance with claim 3, wherein at least one of the sidewalls has a lateral edge folded over at least one adjacent sidewall, thereby registering an edge of said at least one adjacent sidewall with a respective inside corner formed by the folded lateral edge.

6. The filtering apparatus in accordance with claim 1, wherein the cross-sectional area of the housing is three to six times the cross-sectional area of the entry opening.

7. The filtering apparatus in accordance with claim 6, wherein the cross-sectional area of the housing is about four and one-half times the cross-sectional area of the entry opening.

8. The filtering apparatus in accordance with claim 1, wherein the at least a portion of the upstream face is disposed downstream of the edge of the top plate by between two and four inches.

9. The filtering apparatus in accordance with claim 1, wherein the at least a portion of the upstream face is disposed downstream of the edge of the top plate by about three inches.

10. The filtering apparatus in accordance with claim 3, wherein the at least a portion of the upstream face is disposed downstream of the edge of the top plate by between two and four inches.

11. The filtering apparatus in accordance with claim 3, wherein the at least a portion of the upstream face is disposed downstream of the edge of the top plate by about three inches.

12. The filtering apparatus in accordance with claim 1, wherein the overhanging portion reduces paint overspray from forming an airflow-blocking curtain on the upstream face of the filter unit.

13. The filtering apparatus in accordance with claim 3, wherein the overhanging portion reduces paint overspray from forming an airflow-blocking curtain on the upstream face of the filter unit.

* * * * *